Dec. 11, 1962

B. A. HARRIS 3,068,320

TOLL TICKETING TRUNK CIRCUIT

Filed Aug. 3, 1956

6 Sheets-Sheet 1

INVENTOR.
BEN A. HARRIS
BY Francis I. Blake
ATTORNEY

Dec. 11, 1962 B. A. HARRIS 3,068,320

TOLL TICKETING TRUNK CIRCUIT

Filed Aug. 3, 1956 6 Sheets-Sheet 3

Dec. 11, 1962

B. A. HARRIS 3,068,320

TOLL TICKETING TRUNK CIRCUIT

Filed Aug. 3, 1956

6 Sheets-Sheet 4

3,068,320

TOLL TICKETING TRUNK CIRCUIT

Ben A. Harris, Rochester, N.Y., assignor to General Dynamics Corporation, Rochester, N.Y., a corporation of Delaware Filed Aug. 3, 1956, Ser. No. 601,871
5 Claims. (Cl. 179—7)

Figure 7:
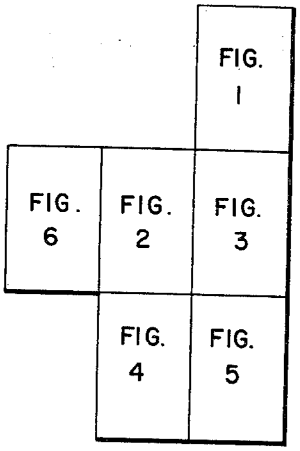

This invention relates to data processing systems, and, more particularly, to systems of this type including a data storing or recording device utilizing an elongated record or storage medium.

In prior data processing systems, such as the automatic toll ticketing system shown in the copending application of M. A. Clement and B. A. Harris, Serial No. 536,579, filed September 26, 1955, now Patent No. 3,003,035, which application is assigned to the same assignee as the present application, there is provided a trunk circuit having an individually associated trunk recorder for storing items of information pertaining to toll calls. The trunk recorder comprises a magnetic recording or storing device utilizing an endless loop of an elongated record or storage medium, such as magnetic tape, which is moved step-by-step relative to transducing heads during a data storing operation. The trunk circuit includes means for supplying information to be recorded to the transducing heads and means for advancing the tape a single step following the recording of each bit of information thereon.

In order to space the group of items of data or information pertaining to one toll call from subsequently recorded data pertaining to a later call, the trunk circuit further includes means for advancing the magnetic tape through a plurality of steps following the recording of each group of items so that the transducing heads are disposed adjacent a portion of the tape which is physically spaced from the previously recorded portion thereof. These prior devices for automatically advancing the "running off" the magnetic tape, such as the one shown in the prior copending application identified above, generally utilize a pulsing source for driving the tape advancing means for a period of time determined by time responsive means. However, this type of device may provide tape advancements of varying lengths. Accordingly, in order to conserve the magnetic tape against excessive "run-offs" which reduce the effective recording length of the tape and which may cause improper operation of pulse responsive control means during tape playback operations while maintaining adequate spacing between adjacent blocks of recorded information, it is desirable to provide means for directly providing a measured tape advancement or "run-off," which means do not increase the cost or the size of the recorder control means in the trunk circuit.

Accordingly, one object of the present invention is to provide means for automatically advancing an elongated record medium a predetermined distance.

Another object is to provide a storage or recording device using an elongated record medium in which means are provided for automatically providing a measured medium "run-off" incident to selected control operations.

Another object is to provide a device for advancing an elongated record medium a predetermined distance which includes medium advancing means driven by a pulsing source under the control of counting means.

A still further object is the provision of improved control means for a trunk recorder in a toll ticketing system which uses a magnetic tape record medium wherein the control means advances the magnetic tape a predetermined number of steps incident to certain control operations, such as the release of a connection.

Figure 1:
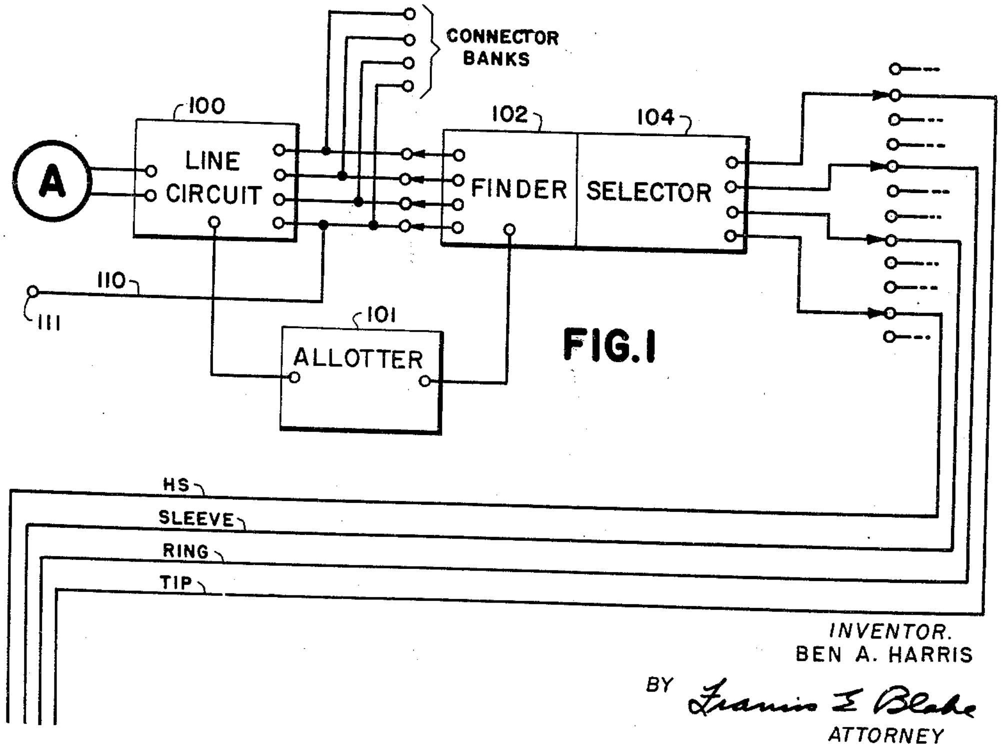
Figure 2:
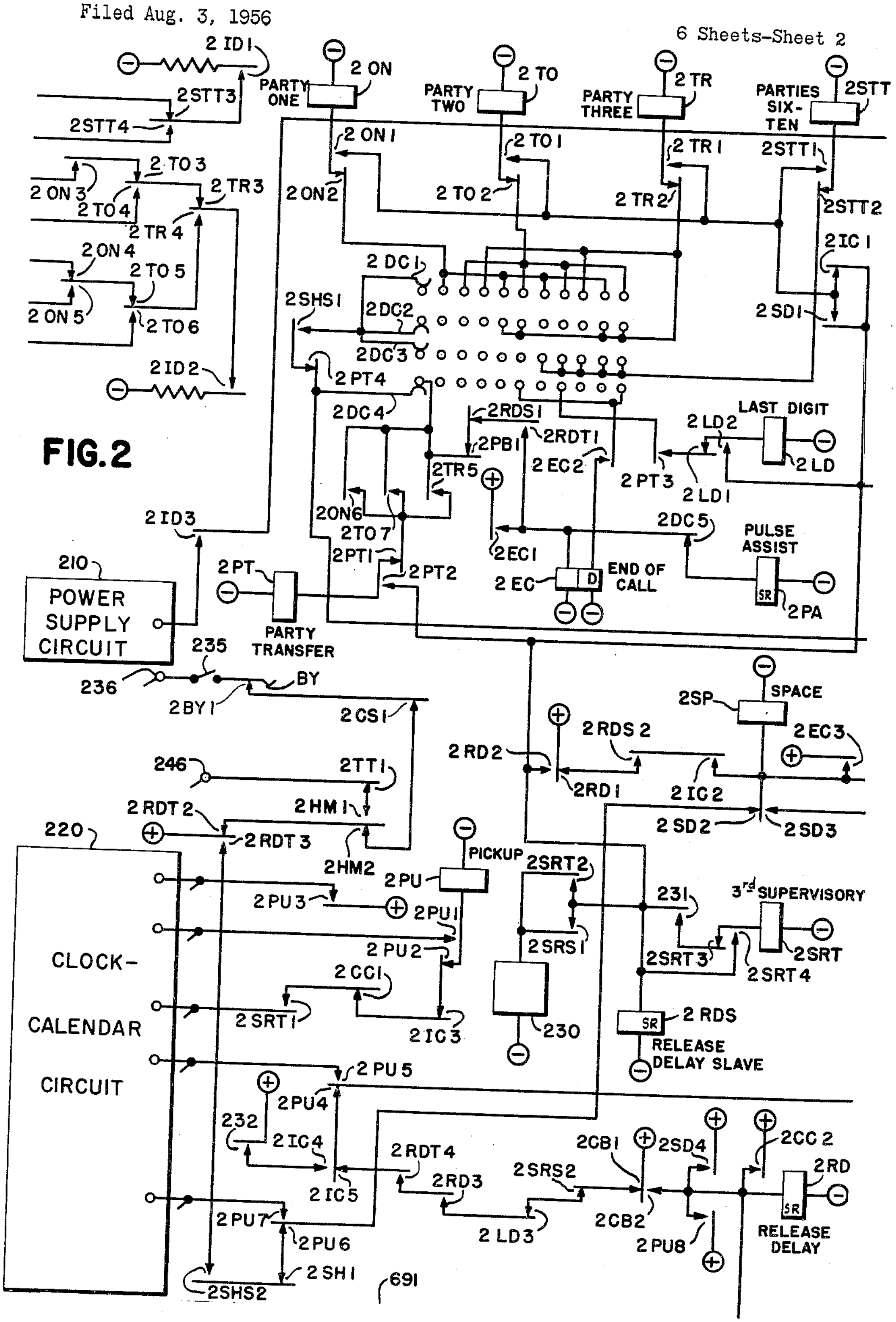
Figure 6:
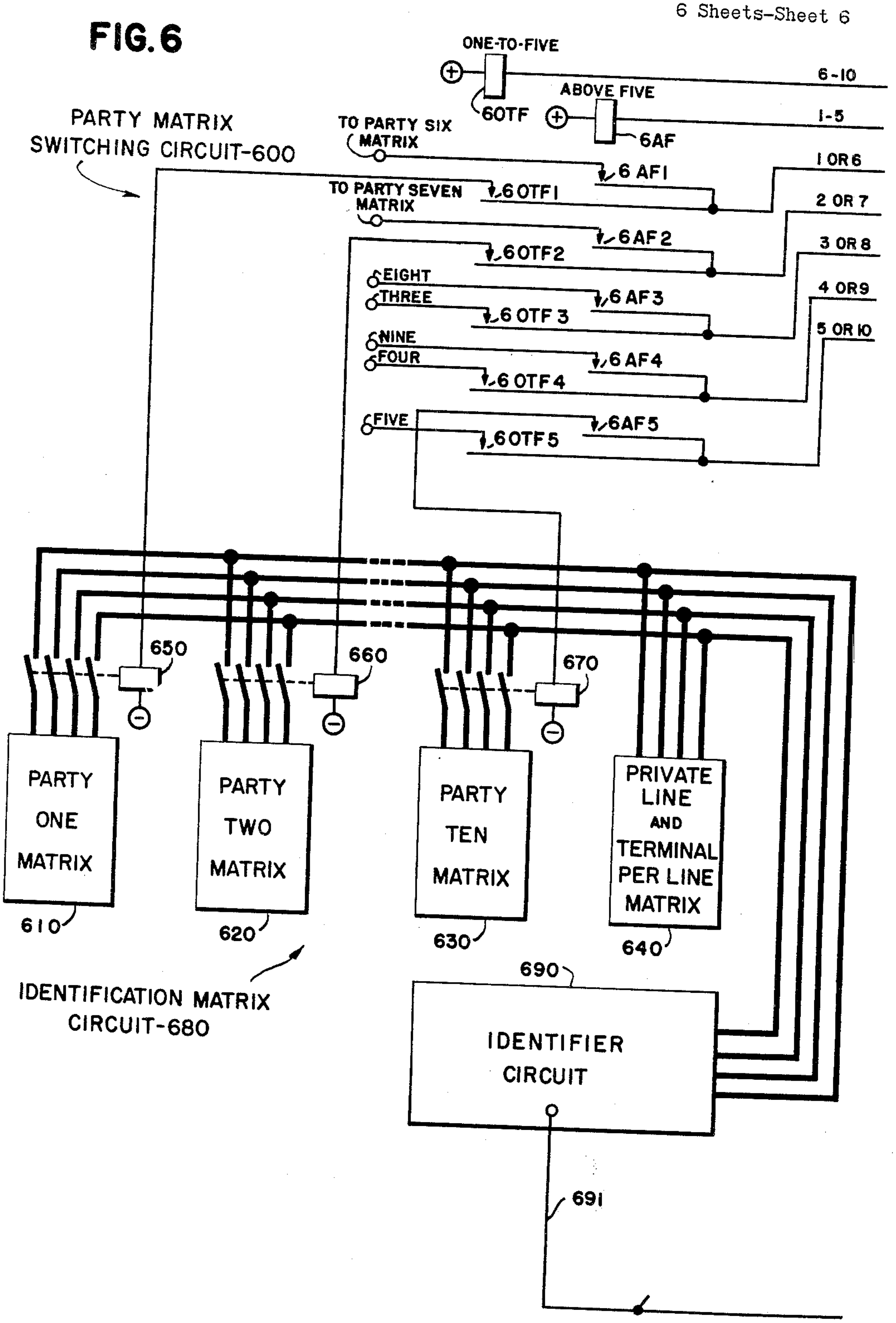

Other objects and advantages of the present invention will become apparent from the ensuing description of an illustrative embodiment thereof in the course of which reference is had to the accompanying drawings in which:

FIG. 1 is a block diagram illustrating conventional automatic telephone switching equipment in a local office from which toll calls to be ticketed are extended;

FIGS. 2 to 5, inclusive, form a schematic drawing illustrating the details of a trunk circuit embodying the present invention;

FIG. 6 is a schematic diagram partially in block form illustrating a party matrix switching circuit in conjunction with other calling subscriber identifying equipment; and FIG. 7 is a block diagram disclosing the manner in which FIGS. 2 to 6, inclusive, are positioned adjacent each other to form a complete circuit diagram of a system embodying the present invention.

In general, the trunk circuit of the present invention is adapted to be utilized in an automatic toll ticketing system of the type disclosed in the above identified copending Clement et al. application. As shown therein, the items of information pertaining to a toll call are collected in a trunk recorder or storage device individual to an outgoing toll trunk under the control of pulses dialed at a calling substation, the trunk recorders being capable of storing the items of information pertaining to a plurality of toll calls. At a selected time of day, such as the early hours of the morning in which the traffic level on the system is relatively low, the trunk circuit is seized by recording and playback facilities to permit the items of information pertaining to a plurality of calls to be sequentially played back from the trunk recorder to control recording facilities for producing a group of permanent records each including the items of information pertaining to a single toll call.

More specifically and referring to FIGS. 1 to 6, inclusive, of the drawings, assuming that a toll call which is to be automatically ticketed is to be extended from a calling substation A to a called substation B located in a remote area, the subscriber at the substation A goes off-hook to extend a circuit to a line circuit 100 individual thereto, the line circuit 100 placing an allotter 101 in operation so that a link comprising a finder 102 and a selector 104 is placed in operation to search for and seize the calling line circuit 100. In response to the completion of the association between the finder-selector link including the units 102 and 104 with the line circuit 100, the calling subscriber is advised that dialing may be initiated to extend the connection to the called subscriber B. The first digit dialed at the calling substation A is an access digit which must be dialed in order to extend the connection to the group of trunks equipped with automatic toll ticketing means which are utilized to extend the connection to the remote area. Assuming that the access digit is "8," in response to the dialing of the access digit "8," the selector 104 advances its wipers to the eighth level and thereafter automatically searches over the multiples in the eighth level to seize an idle outgoing trunk extending to the desired remote area. Assuming that the trunk circuit shown in FIGS. 2 to 5, inclusive, is the first idler trunk circuit in the eighth level of the selector 104, the calling loop circuit is extended to this trunk circuit, thereby to prepare the trunk circuit for controlling the extension of the connection to the called substation B and for recording the items of information pertaining to the toll call in a trunk recorder 500 which is individual to this trunk circuit.

The first item of information dialed at the calling substation A following the seizure of an idle trunk circuit is a dialed party digit which has an arbitrary value if the calling substation A is on a private line, which has a value representing the units digit of the directory number of the calling substation if the substation A is on a terminal per line multiparty line, and which has a value corresponding to the position of the calling substation A on a multiparty line if the multiparty service on the line is provided on a terminal per station basis. This dialed party digit is not repeated to remote switching equipment 300 but rather is simultaneously recorded in the trunk recorder or storage device 500 and utilized to control the setting of a stepping switch in the trunk circuit. The final setting of the stepping switch operates a selected number of party digit register relays to prepare a single marking path on one of five conductors representing parties 1 or 6, 2 or 7, 3 or 8, 4 or 9, and 5 or 10 and to prepare a single marking path on a pair of conductors representing parties one to five or parties six to ten. These conductors extend to a party matrix switching circuit 600 and control this circuit at a later point in the data recording process to select a proper control component or party matrix for automatically determining the directory number of a calling substation on a terminal per station multiparty line. Following the completion of the dialing of the dialed party digit by the calling subscriber at the substation A, the stepping switch in the trunk circuit is returned to a normal condition and the trunk circuit is rendered capable of transmitting subsequently dialed digits to control the operation of the remote switching equipment 300 to extend the connection to the called subscriber B.

The next item of information dialed by the subscriber at the station A is the group of digits forming the directory number of the called substation B, and, assuming that a conventional "2–5" numbering scheme is utilized, the subscriber at the station A dials seven digits, all of which are simultaneously recorded in the trunk recorder 500 and repeated over the outgoing trunk to the remote switching equipment 300, thereby to extend the connection to the called substation B. Simultaneously with thus utilizing the dialed digits representing the directory number of the called substation B, the trunk circuit advances the stepping switch therein in the interdigit interval so as to count the dialed switch operating digits so as to render the trunk circuit incapable of repeating additional digits over the outgoing trunk after a predetermined number of digits, i.e. seven, have been dialed.

In response to the receipt of answering supervisory signals from the remote switching equipment 300, a motor driven timing mechanism which is adapted to provide a control impulse, at a selected time interval, such as one to two seconds, following the receipt of answering supervision and other pulses at one minute intervals representing elapsed time for the call is rendered effective so that, if the connection is not released within the first short time interval of from one to two seconds, the trunk circuit is advised that the call is to be ticketed and initiates the recording of date and time information in the trunk recorder 500. More specifically, the general system includes a clock-calendar circuit 220 of the type disclosed in the above identified Clement et al. application which, upon actuation, provides a series of pulses representing the date and time on which the call being ticketed was placed, these pulses being recorded in the trunk recorder 500.

In response to the completion of the storage of the clock-calendar information in the trunk recorder 500, the trunk circuit applies ground to an identifier sender allotter (not shown) to initiate the automatic determination of the directory number of the calling substation A and the storage of this information in the trunk-recorder 500. More specifically, the identifier sender allotter, which may be of the type disclosed in the above identified copending Clement et al. application, allots an idle one of a plurality of identifier senders, similar to an identifier sender 310, to the calling trunk circuit. The identifier sender 310 may be of the type disclosed in the above identified copending Clement et al. application or may be of the type disclosed in the copending application of Ben A. Harris, Serial No. 518,952, filed April 18, 1956, which application is assigned to the same assignee as the present application. In response to the completion of the association of the identifier sender 310 with the trunk circuit, a power supply circuit 210, which is also of the type disclosed in the above identified copending Clement et al. application, is rendered effective to supply an identification potential over the HS lead of the extended switch train to selectively energize an identification conductor 110 which is individual to the calling line circuit 100 and which terminates in a terminal 111. The terminal 111 is selectively connected to an identification matrix circuit 680, which is also of the type disclosed in the above identified copending Clement et al. application, in accordance with the type of service provided to the calling substation A. In the event that the substation A is on a private line, the terminal 111 is selectively interconnected with a private line and terminal per line matrix 640 in accordance with the digits forming the directory number of the calling substation A. Also, if the calling substation A is located on a terminal per line multiparty line, the terminal 111 is connected to the matrix 640 so as to provide marking conditions representing the thousands, hundreds, and tens digits of the directory number of the substation A, the units digit being provided by the dialed party digit as described above. If the calling substation A is located on a terminal per station multiparty line, the terminal 111 is connected in multiple to all of a plurality of ten party matrices of which only a party one matrix 610, a party two matrix 620, and a party three matrix 630 are shown in the drawings so that as many as ten separate marking conditions are established in the identification matrix circuit 680 in accordance with the different groups of digits forming the directory numbers of all of the substations on the terminal per station multiparty line on which the station A is located.

In the event that the terminal 111 is connected to the private line and terminal per line matrix 640, the energization thereof selectively operates an identifier circuit 690, which may be of the type disclosed in either of the above identified copending Clement et al. or Harris applications, to provide marking conditions extending to the identifier sender 310 associated with the trunk circuit representing the digits forming the directory number of the calling substation on either the private line or the terminal per line multiparty line. Alternatively, if the calling substation A is located on a terminal per station multiparty line, marking conditions representing different designations are established in any number of the individual party matrices 610, 620, and 630. To determine the proper one of these matrices to be interconnected with the input to the identifier circuit 690, the party matrix switching circuit 600 is utilized. As described above, one or more of the group of the party register relays is selectively operated under the control of the stepping switch in the trunk circuit in response to the dialing of the dialed party digit. In response to the receipt of information indicating that the identifier sender 310 has been associated with the trunk circuit, ground is applied to the paths prepared by the selective operation of the party register relays to selectively operate the party matrix switching circuit 600 so that only a single one of the ten party matrices including the matrices 610, 620, and 630 is cut through to the input of the identifier circuit, thereby to provide signals to the identifier sender 310 representing only a single one of the directory numbers in accordance with the position of the calling substation A on the terminal per station multiparty line.

In response to receiving calling subscriber designation digits from the identifier circuit 690, the identifier sender releases the identifier sender allotter, the identifier circuit 690, the identification matrix circuit 680, and the party matrix switching circuit 600, and removes the identification potential from the HS lead of the extended switch train and the identification conductor 110, thereby to release the common equipment components for use in identifying a subscriber involved in a subsequently placed toll call. If satisfactory calling subscriber data is provided, the identifier sender 310 initiates the transmission of a series of pulses to the trunk recorder 500 in accordance with the digital information stored in the sender 310 representing the designation of the calling substation A. However, if a satisfactory calling subscriber identification is not provided, the identifier sender 310 prevents the continuation of the connection and arrests the recording of additional toll call data.

Following the completion of the transmission of the necessary information representing the directory number of the calling substation A, the identifier sender 310 is restored to its normal condition, and the timing device individual to the trunk circuit transmits duration impulses at one minute intervals which are stored in the storage device or trunk recorder 500, thereby to provide a record of the length of the toll call. When the connection is released, the storage of the duration impulses in the trunk recorder 500 is terminated, and the stepping switch, which has remained in a position representing the number of dialed switch extending digits, is restored to a normal position. This stepping switch thereafter cooperates with a pulse generating source in the trunk circuit to sequentially advance an elongated medium forming the record medium in the trunk recorder 500 through a series of steps which are counted by the stepping switch to provide a measured run-off for spacing the previously recorded items pertaining to the toll call just completed from the items of information pertaining to the next toll call placed through the trunk circuit. Prior to spacing out the elongated medium, the trunk recorder records an end-of-call code on the elongated record medium representing the end of the items of information pertaining to the toll call. Following the completion of the spacing operation under the control of the stepping switch, the stepping switch is restored to its normal condition together with the remainder of the components in the trunk circuit, thereby to permit the trunk circuit to be utilized in controlling items of information pertaining to a plurality of subsequently extended toll calls.

To initiate a routine playback operation in which the items of information stored in a plurality of trunk recorders similar to the trunk recorder 500 are transmitted to recording facilities 410, which may be of the type disclosed in the above identified copending Clement et al. application, a start ground is forwarded to the recording means 410 at a selected time of day, preferably during the early morning hours, so that the recording means 410 is placed in operation to seize a playback control circuit 400, which also may be of the general type disclosed in the above identified copending Clement et al. application. In response to seizure, the playback control circuit 400 places a switching means therein in operation to search for and sequentially seize the plurality of trunk circuits to which it has access. In seizing the first trunk circuit, this trunk circuit is operated to advance the magnetic tape in the recorder individual thereto to its effective beginning and thereafter movement of the magnetic tape under the control of the trunk circuit is terminated and transferred to the playback control circuit 400. The playback control circuit 400, working in conjunction with the recording facilities 410, intermittently advances the magnetic tape so that the items of information stored therein are transmitted to the recording facilities 410 to control the production of records, each of which relates to one of the complete calls whose data is recorded in the seized trunk recorder.

Incident to seizing the first trunk circuit, an advance circuit is completed extending to control means in the next trunk circuit to which the playback switching means has access, which control means, when operated, initiates the movement of the magnetic tape in the next succeeding trunk recorder to its effective beginning so that, when this next succeeding trunk circuit is seized, the delay inherent in advancing the magnetic tape to its effective beginning is obviated. The return of the magnetic tape to its home condition, however, places the trunk circuit in a busy condition, thus preventing its seizure for recording items of information pertaining to toll calls. In the prior trunk circuit disclosed in the above identified copending Clement et al. application, the control means for advancing the magnetic tape to its effective beginning in advance of the seizure of the trunk circuit with which each of the trunk recorders is associated was such that, under certain operating conditions such as a busy condition of a given one or more of the trunk circuits, the advance circuit for returning the magnetic tape to its effective beginning was effectively extended to the first idle trunk circuit. In this manner, it was possible for virtually all of the trunk circuits in a given trunk group to be placed in a busy condition either due to the recording of the items of information or due to the return of the magnetic tapes to their effective beginning. Thus, with all of the trunk circuits in a busy condition for one reason or another, the traffic handling capabilities of the trunk group was materially reduced. Accordingly, in the trunk circuit of the present invention, the control means or advance circuit means for advancing the magnetic tapes in succeeding trunk circuits to their effective home positions is so arranged that, if any given trunk circuit is engaged in recording items of information pertaining to a toll call during the time in which a playback operation is being performed, the advance circuit for the next succeeding trunk circuit is interrupted to prevent placing an excessive number of trunk circuits in a busy condition. However, this series circuit arrangement is such that if the trunk circuit has been placed in a busy condition due to the manual operation of busying means or due to the establishment of an alarm condition in the trunk circuit, the series circuit relationship is maintained intact so that a trunk circuit which is busy for one of these reasons is effectively bypassed and the next succeeding idle trunk circuit is operated to return the magnetic tape in the trunk recorder individual thereto to its effective beginning.

Following the completion of the transmission of all of the items stored in any given one of the trunk recorders, the trunk circuit associated therewith first returns the magnetic tape to its effective beginning and thereafter renders the stepping switch and the pulse generating means therein effective to provide a measured run-off or a preselected distance between the effective beginning and the position on the elongated record medium at which the items of information pertaining to the first toll call are to be recorded. In response to the completion of the run-off operation, the trunk circuit is restored to a normal condition in which it is capable of being seized by line extending means and utilized in controlling the recording of items of information pertaining to toll calls. Following the completion of the playback of all of the trunk recorders associated with trunk circuits to which the playback control circuit has access, the playback control circuit 400 and the reording facilities 410 are restored to a normal condition.

It is often desirable, in providing proper maintenance for the toll ticketing facilities and including the trunk circuit, to dial the items of information pertaining to a test call directly into the trunk circuit, thereby to provide the trunk recorder 500 with the items of information pertaining to a test call, or to monitor the items of information being recorded in the trunk recorder 500 pertaining to a normal toll call. To permit the monitoring of items of information pertaining to a regularly established toll call, the trunk circuit is provided with test means permitting the connection of a monitoring or test device across the tip and ring conductors of the connection extended to the trunk circuit, thereby to audibly or visibly monitor the dialed information being supplied thereto. Alternatively, if it is desired to manually and directly insert information pertaining to a test call directly into the trunk circuit for recording by the trunk recorder 500, the test means are utilized in conjunction with a manually operated busy key, the conjoint operation of which permits a direct manually controlled recording of test call data in the trunk recorder 500.

In the prior trunk circuits of the type disclosed in the above identified copending Clement et al. application, it is not possible to directly dial test call information into the trunk recorder 500 inasmuch as, as described above, the trunk circuit is forcibly returned to a released condition in the event that the identifier sender 310 is not provided with a satisfactory calling line identification, and, since the provision of this information is dependent upon returning an identification potential over an extended switch train to the identification matrix 680, the recording of test call data produced by dialing directly into the trunk circuit would be interrupted at the recording of the calling subscriber designation because of the lack of an extended switch train to the trunk circuit. However, in the trunk circuit of the present invention, the test means includes means for supplying an identification potential directly from the trunk circuit to a preassigned test number in the private line and terminal per line matrix 640 so that, in response to operation of the testing means following the operation of a manually controlled busy means which prevents seizure of the trunk circuit, an artificial calling line designation is automatically supplied to the trunk circuit and to the trunk recorder 500 to permit the recording of complete data pertaining to a test call.

To facilitate an easy understanding of the detached contact type of drawings utilized in the following description of an illustrative embodiment of the invention, a combined numerical and alphabetical designation has been utilized to identify many of the relay structures and manually operated keys forming the schematic diagram of the trunk circuit. The windings of the relays are identified by one or more numerical digits indicating the figures of the drawings on which the relay winding is to be found followed by a group of alphabetical characters designating the relay. The contacts pairs of the various relays in the schematic circuit diagram are designated by a composite alphabetical and numerical designation in which one or more numerical characters identifying the figure of the drawings on which the contact pair is located is followed by a group of alphabetial characters indicating the relay of which the contacts form a part. One or more numerical characters are added to this designation to individually designate the different contacts of the same relay appearing in a single figure of the drawings.

Figure 3:
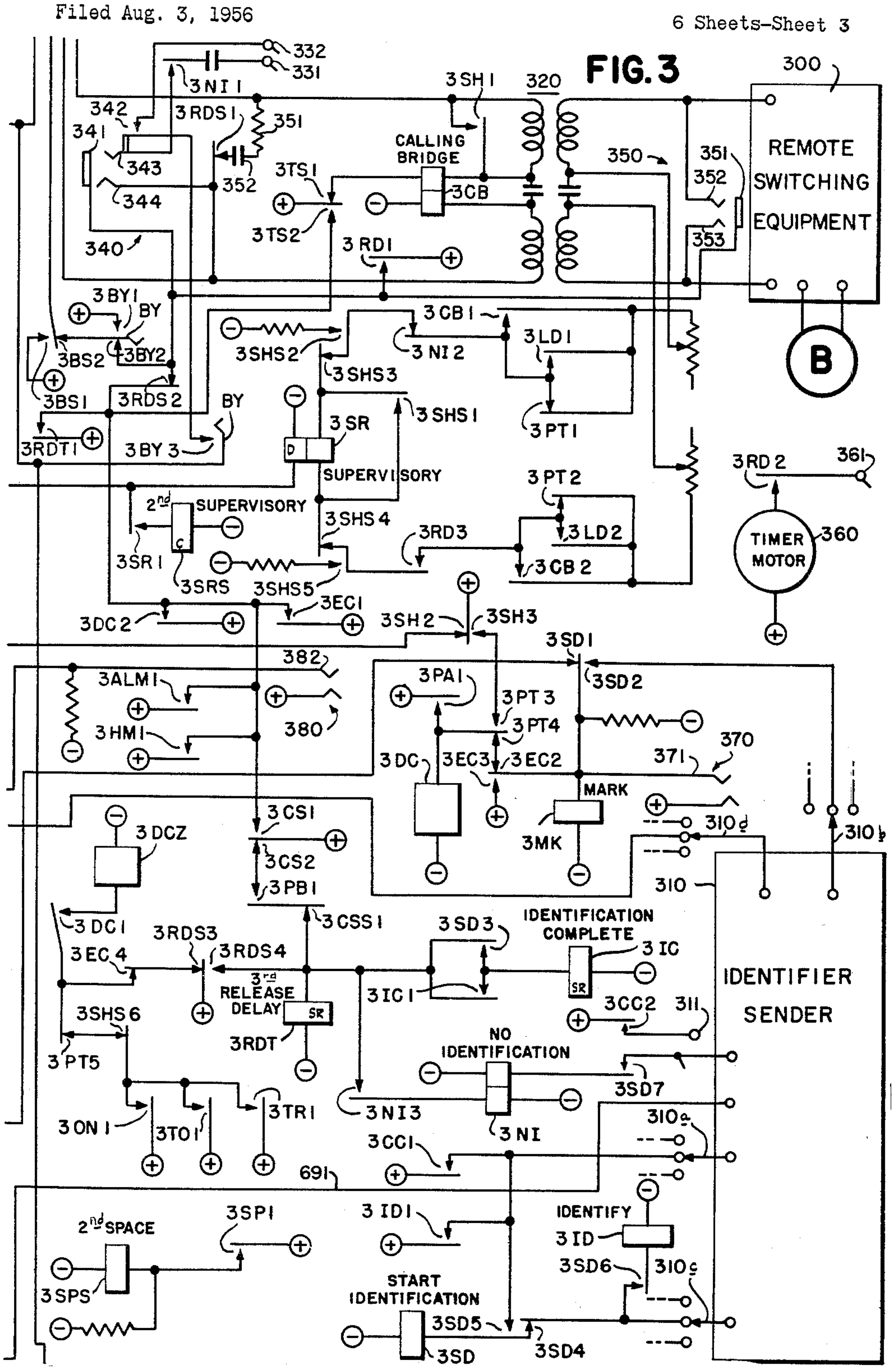
Figure 4:
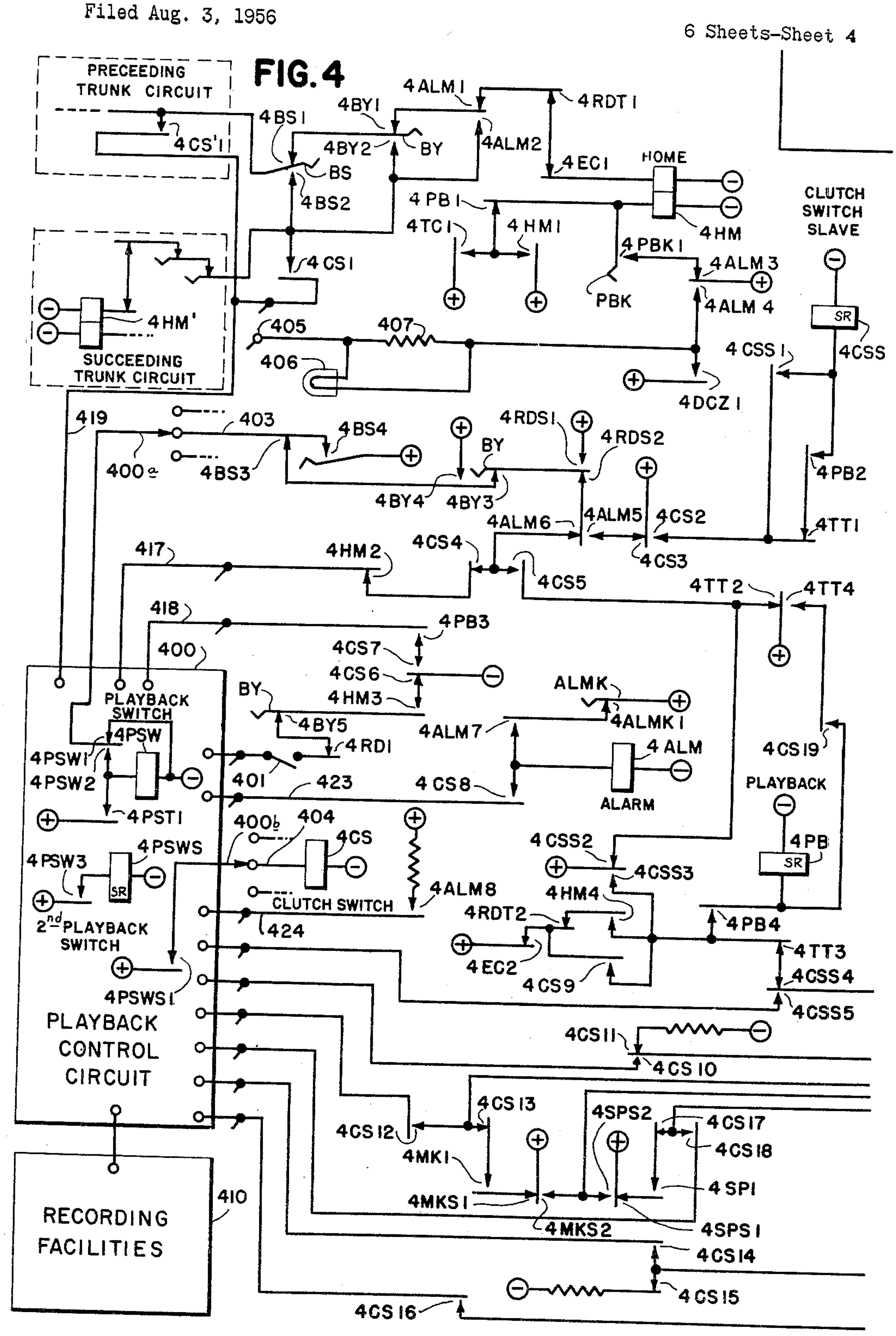
Figure 5:
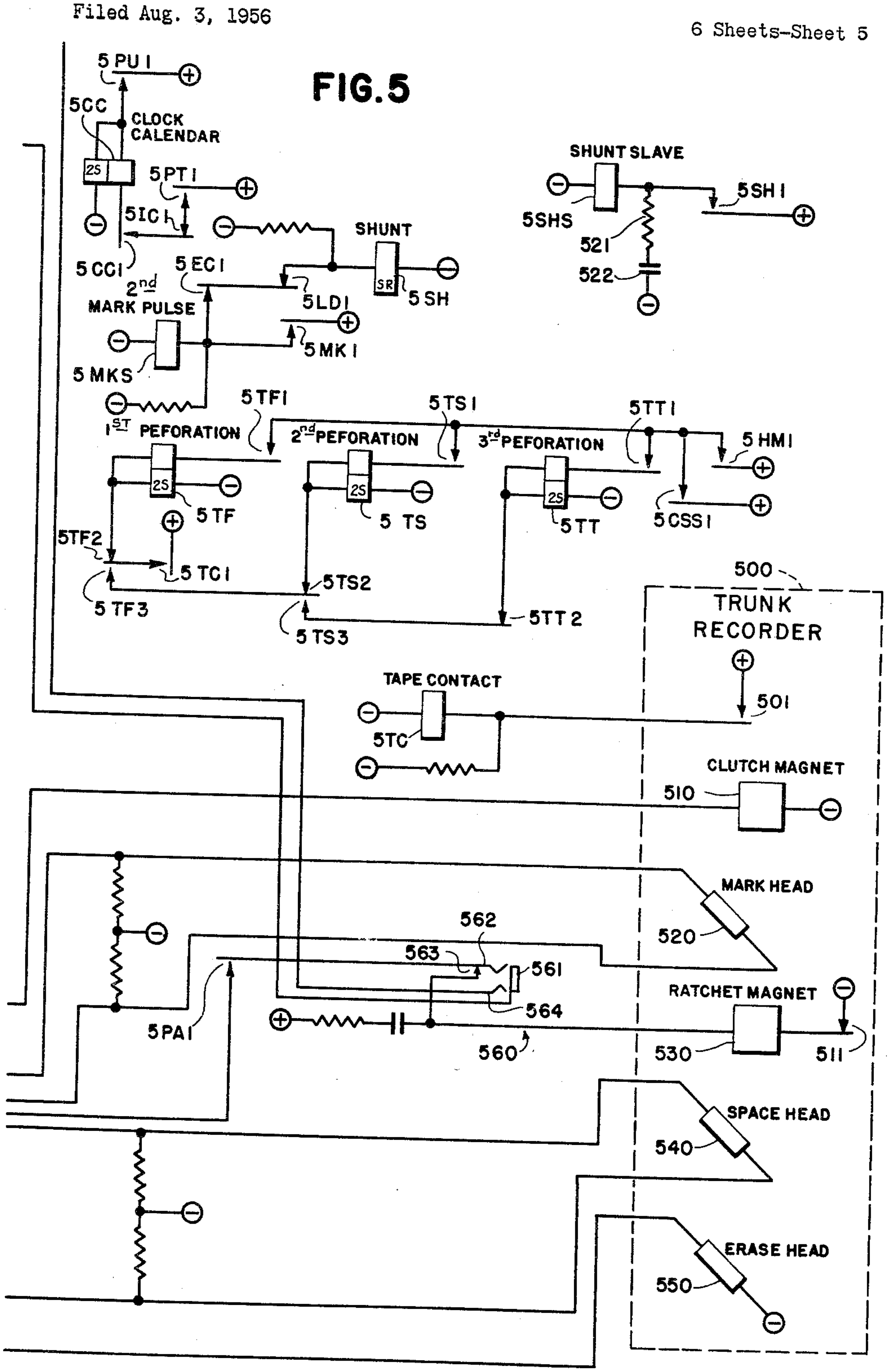

As an example, a calling bridge relay having an operating winding located in FIG. 3 of the drawings is designated 3CB, and the contacts of this relay which are also located in FIG. 3 of the drawings are designated 3CB1 and 3CB2. Two other contact pairs forming a part of this relay appear in FIG. 2 of the drawings and, accordingly, are designated 2CB1 and 2CB2 to indicate the first and second contact pairs of the CB relay that are located in FIG. 2.

In addition, certain of the keys forming a part of this schematic diagram, which may be either automatically of manually operated, are designated by one or more alphabetical characters identifying the key. The contacts on the key are designated by one or more numerical character indicating the figure of the drawings on which the contacts are located followed by the alphabetical characters identifying the key and one or more numerical characters individually designating the different contact pairs of the key which appear in the same figure of the drawings. For instance, an alarm key ALMK includes the pair of contacts 4ALMK1 located in FIG. 4 of the drawings.

The remaining components in the schematic diagram are identified by solely numerical designations in which the digits other than the last two designate the figure of the drawings on which the element is located. For instance, the identifier sender 310 is located in FIG. 3 of the drawings, whereas the identifier circuit 690 is located in FIG. 6 of the drawings.

*Trunk Recorder 500*

The trunk recorder 500 is of the type disclosed in the copending application of Howard S. Gleason, Serial No. 378,209, filed September 3, 1953, which application is assigned to the same assignee as the present application. In general, the recorder 500 comprises a base plate on which is detachably mounted a magazine containing an endless loop of magnetic tape which is stored in random layer fashion. A portion of the magnetic tape, which is disposed outside of the magazine, is moved relative to a pair of transducing heads by one of a pair of driving means. The transducing heads comprise a record-reproduce space pulse head 540 and a record-reproduce mark pulse head 520 having two magnetic gaps which are disposed adjacent contiguous transversely spaced portions of the magnetic tape to define two separate channels for receiving mark and space pulse information. Another transducing head comprises an erase head 500 having a single gap which is adapted to erase the entire width or both channels of the magnetic tape.

During recording operations, the magnetic tape is stationary, and the first advancing means comprises a step-by-step advancing mechanism including a pawl and ratchet drive arrangement driven by an advance magnet 530 for advancing the magnetic tape through a very small distance following the recording of each pulse. In order to provide high speed playback or readout operations, a continuous drive mechanism is provided. This drive mechanism comprises a clutch magnet or solenoid 500 which moves a clutching idler into a position interposed between a driving roller and a pinch roller and capstan type of drive arrangement which directly drives the magnetic tape. In this manner, during playback operations, the magnetic tape in the trunk recorder 500 is rapidly advanced to produce mark and space impulses which are transmitted through the trunk circuit and the playback control circuit 400 to the recording facilities 410. A pair of contacts 511 in the energizing circuit for the magnet 530 are controlled by the clutch magnet 510 to prevent step-by-step operation of the magnetic tape during continuous drive operations.

In order to provide means for returning the magnetic tape in the trunk recorder 500 to its ineffective beginning or home position prior to recording and reproducing operations and in order to provide an alarm indication when the magnetic tape in the trunk recorder 500 is filled with items of information, a pair of tape controlled contacts 501 are provided which cooperate with three spaced perforations or conductive portions on the surface of the magnetic tape so as to define the effective beginning and end thereof. As disclosed in the above identified Gleason application, the tape contact structure may comprise portions carried on the surface of the tape which selectively bridge contact fingers held in engagement with one surface of the magnetic tape. Alternatively, the tape contact arrangement may comprise a grounded roller and a contact brush between which the magnetic tape is interposed so that the brush and roller arrangement sense spaced perforations in the magnetic tape.

*Operation of the Trunk Circuit To Record Information in the Trunk Recorder 500*

During recording operations, the trunk circuit, under the control of dial impulses supplied from the calling subscriber and answering supervisory signals received from the calling subscriber, selectively controls the recording of items of information pertaining to a toll call on the magnetic tape of the trunk recorder 500. At the termination of the recording operation, an end-of-call code is recorded on the magnetic tape of the trunk recorder 500, and a stepping switch and a pulsing source cooperate to advance the magnetic tape a predetermined distance following the last of the recorded items of information pertaining to the preceding toll call.

Referring now more specifically to the drawings, as described above, in response to the dialing of an access digit, the calling loop circuit is extended from the calling substation A through the line circuit 100, the finder 102, and the selector 104 to the trunk circuit shown in FIGS. 2 to 5, inclusive. This extension of the switch train to the trunk circuit completes the calling loop circuit through the input windings of a repeater coil 320 and the upper and lower windings of a calling bridge relay 3CB to ground through a pair of normally closed contacts 3TS1 and to grounded battery. The completion of this circuit operates the calling bridge relay 3CB to open a pair of contacts 3CB1 and to close a plurality of contacts 2CB2, 3CB1, and 3CB2. The closure of the contacts 3CB1 and 3CB2 and the opening of the contacts 2CB1 serve no useful function at this time. However, the closure of the contacts 2CB2 completes an obvious operating circuit for a release delay relay 2RD so that this relay operates to open a plurality of contacts 2RD1 and 4RD1 and to close a plurality of contacts 2RD2, 2RD3, 3RD1, 3RD2, and 3RD3.

The closure of the contacts 3RD1 applies ground to the sleeve lead of the extended switch train, thereby to hold the switch train operated and to indicate that the trunk circuit is busy. The opening of the contacts 4RD1 further opens an interrupted path for initiating an emergency playback operation of the trunk circuit by the playback control circuit 400. The closure of the contacts 3RD2 interconnects a timer motor 360 to a terminal 361 which is provided with a suitable energizing voltage, thereby to condition the timing means individual to the trunk circuit for operation. The closure of the contacts 3RD3 completes a circuit including the contacts 3SHS3, 3NI2, 3CB1, or 3PT1, 3SHS4, 3RD3, and 3PT2 or 3CB2 for placing the right hand operating winding of the differential supervisory relay 3SR across the outgoing tip and ring conductors of the trunk circuit. Further, the closure of the contacts 2RD2 energizes the left hand winding of the relay 3SR, but the supervisory relay 3SR is not operated at at this time. The closure of the contacts 2RD3 prepares an operating circuit for a mark pulse relay 3MK and a motor magnet 3DC of a stepping switch DC, and the opening of the contacts 2RD1 performs no useful function at this time.

The closure of the contacts 2RD2 also provides a source of main holding ground for the trunk circuit and completes an obvious operating circuit for a release delay slave relay 2RDS which operates to open a plurality of contacts 2RDS1, 3RDS1, 3RDS2, 3RDS3, and 4RDS2 and to close a plurality of contacts 2RDS2, 3RDS4, and 4RDS1. The closure of the contacts 4RDS1 grounds a conductor 403 to prevent seizure of the trunk circuit during a data recording operation, and the concurrent opening of the contacts 4RDS2 performs no useful function at this time. The opening of the contacts 3RDS2 further interrupts one open circuit for supplying ground to the trunk sleeve terminal or conductor, ground remaining thereon at the closed contacts 3RD1. The opening of the contacts 2RDS1 interrupts a point at an open operating circuit for a differential end-of-call relay 2EC, and the closure of the contacts 2RDS2 prepares an operating circuit for a space relay 2SP. The opening of the contacts 3RDS1 opens a shunt including a resistor 351 and a condenser 352 which is across the repeater coil 320. The resistor 351 has a value approximating that of the proper termination resistance for the trunk circuit looking into the trunk circuit from the remote switching equipment 300. The opening of the contacts 3RDS3 interrupts an additional point in an open operating circuit for a reset magnet 3DCZ of the stepping switch DC.

The concurrent closure of the contacts 3RDS4 completes an obvious operating circuit for a slow-to-release third release delay relay 3RDT so that this relay operates to close a plurality of contacts 2RDT1, 2RDT3, 2RDT4, and 3RDT1 and to open a plurality of contacts 2RDT2, 4RDT1, and 4RDT2. The closure of the contacts 2RDT1 prepares an operating circuit for the end-of-call relay 2EC, and the opening of the contacts 2RDT2 removes ground from a circuit extending through a plurality of closed contacts 2HM2, 2CS1, and 2BY1 and a normally closed switch 235 to a terminal 236 which is connected to a common supervisory control. The removal of ground from this terminal indicates that the trunk circuit is in a busy condition. The normally closed switch 235 is opened by the removal of the trunk decoder 500 to provide an indication that the trunk circuit is busy. The closure of the contacts 2RDT3 prepares an operating circuit for the space relay 2SP, and the closure of the contacts 2RDT4 prepares another portion of the operating circuit for the mark relay 3MK and the motor magnet 3DC of the stepping switch DC. The closure of the contacts 3RDT1 provides an additional source of holding ground for the sleeve lead of the extended switch train, which ground is interrupted at the open contacts 3RDS2. The opening of the contacts 4RDT1 interrupts a point in an operating circuit for a home relay 4HM, thereby to prevent the operation of this relay during a data recording operation. The opening of the contacts 4RDT2 performs no useful function at this time.

The trunk circuit, in response to the seizure thereof, has operated the calling bridge relay 3CB and the release delay relays 2RD, 2RDS, and 3RDT to prepare pulsing paths for the space relay 2SP, the mark relay 3MK, and the motor magnet of the stepping switch 3DC to provide holding ground for the extended switch train and to provide busy ground to prevent additional attempted seizure of the trunk circuit by the circuit 400 or the telephone switching means. The trunk circuit is now conditioned to receive the first dialed information from the substation A which simultaneously operates the stepping switch DC and is recorded in the trunk recorder 500 but which is not repeated over the outgoing lines of the trunk circuit to the remote switching equipment 300.

The first item of information which is dialed by the calling subscriber at the station A following the seizure of the trunk circuit is a party digit which, as explained above, is of arbitrary value for calls placed from private lines, forms the units digit of the directory number for calling substations on terminal per line multiparty lines, and is utilized to selectively position the stepping switch DC to provide information for subsequently controlling the operation of the party matrix switching circuit 600 if the calling substation A is located on a terminal per station multiparty line. Accordingly, when the calling loop circuit extending to the trunk circuit is first interrupted incident to transmission of the first impulse of the dialed party digit, the calling bridge relay 3CB releases to close the contacts 2CB1 and to open the contacts 2CB2, 3CB1, and 3CB2. The operations of the contacts 3CB1 and 3CB2 produce no useful function inasmuch as these contacts are shunted by the closed contacts 3PT1 and 3PT2. The opening of the contacts 2CB2 interrupts the above described operating circuit for the release delay relay 2RD, but this relay is slow-to-release and does not release at this time.

The closure of the contacts 2CB1 applies ground through a circuit including the closed contacts 2SRS2, 2LD3, 2RD3, 2RDT4, 2IC5, 2PU4, and 3SD1 to be applied to the operating winding of the mark relay 3MK, thereby operating this relay to close two pairs of contacts 4MK1 and 5MK1. The closure of the contacts 4MK1 forwards ground over a circuit including the closed contacts 4MKS1, 4MK1, 4CS13 to be applied to the operating winding of the mark pulse head 520, the other side of which is connected to grounded battery through a pair of normally closed contacts 4CS11. The completion of this circuit energizes the mark pulse head 520 to record a mark or information pulse on the mark pulse channel of the magnetic tape in the trunk recorder 500 representing the first pulse of the dialed party digit. The closure of the contacts 5MK1 completes an obvious operating circuit for a second mark pulse relay 5MKS which operates to open the contacts 4MKS1 and to close a pair of contacts 4MKS2. The opening of the contacts 4MKS1 interrupts the above described circuit for energizing the mark pulse head 520, thereby terminating the recording of the first mark pulse in the trunk recorder 500. The concurrent closure of the contacts 4MKS2 completes an operating circuit for the ratchet magnet 530 extending from ground through the closed contacts 4MKS2, 5PA1, and 563, and the winding of the magnet 530 to grounded battery through a pair of contacts 511 controlled by the clutch magnet 510. The energization of the magnet 530 conditions the step-by-step driving mechanism in the trunk recorder 500 for advancing the magnetic tape a single step following the recording of the mark pulse thereon.

Referring to the above described circuit for operating the mark relay 3MK, the ground extended to the operating winding thereof in response to closing the contact 2CB1 is also extended through a plurality of closed contacts 3EC2 and 3PT4 to energize the motor magnet 3DC of the stepping switch DC so that a plurality of wipers 2DC1, 2DC2, 2DC3, and 2DC4 are advanced, the switch DC being of the direct acting type. In moving to the first stepping position in the bank of contacts adjacent thereto, the wiper 2DC1 prepares an operating path for a party one relay 2ON, which is one of a group of four party digit register relays including a group of other register relays 2TO, 2TR, and 2STT. However, the operating circuit for the party one relay 2ON is not completed at this time inasmuch as ground is not supplied to any of the wipers 2DC1, 2DC2, or 2DC3. Thus the stepping switch DC is advanced a single step in synchronism with the recording of a single mark pulse on the magnetic tape in the trunk recorder 500 in response to the transmission of the first impulse of the dialed party digit.

The operation of the motor magnet 3DC also opens a pair of interrupter contacts 2DC5, but this produces no useful function at this time. In advancing, the wipers 2DC1–2DC4 close a plurality of off-normal contacts 3DC1 and 3DC2. The closure of the contacts 3DC1 prepares an operating circuit for the reset or release magnet 3DCZ, and the closure of the contacts 3DC2 prepares an additional circuit for applying ground to the sleeve terminal of the trunk circuit.

Referring back to the closure of the contacts 5MK1 in response to the operation of the mark relay 3MK, the ground provided thereby is extended through a plurality of closed contacts 5EC1 and 5LD1 to complete an obvious operating circuit for a slow-to-release shunt relay 5SH which, in operating, opens a plurality of contacts 2SH1 and 3SH2 and closes a plurality of contacts 3SH1, 3SH3, and 5SH1. The closure of the contacts 3SH1 shunts the uppermost winding of the repeat coil 320, thereby reducing the resistance in the pulsing circuit for the calling bridge relay 3CB. The opening of the contacts 3SH2 interrupts an additional point in the circuit for applying ground to the wipers 2DC1, 2DC2, and 2DC3 of the stepping switch DC, and the concurrent closure of the contacts 3SH3 prepares an operating circuit for the motor magnet 3DC of the switch DC. The opening of the contacts 2SH1 interrupts a point in an operating circuit for the space relay 2SP.

The closure of the contacts 5SH1 completes an obvious operating circuit for a shunt slave relay 5SHS which, in operating, closes a plurality of contacts 2SHS1, 2SHS2, 3SHS1, 3SHS2, and 3SHS5 and opens a plurality of contacts 3SHS3, 3SHS4, and 3SHS6. The closure of the contacts 2SHS1 prepares a circuit for applying ground to the wipers 2DC1, 2DC2, and 2DC3 of the stepping switch DC, which circuit is interrupted at the open contacts 3SH2. The closure of the contacts 2SHS2 prepares a portion of an operating circuit for the space relay 2SP, which circuit is interrupted at the open contacts 2SH1. The closure of the contacts 3SHS1 applies a shunt around one of the operating windings of the supervisory relay 3SR, and the opening of the contacts 3SHS3 and 3SHS4 disconnects this winding of the supervisory relay from the pulsing paths extending to the conductors of the trunk circuit. The closure of the contacts 3SHS2 connects grounded battery to one of the leads of the trunk circuit through a circuit including the closed contacts 3NI2 and 3PT1, and the concurrent closure of the contacts 3SHS5 connects ground to the other of the conductors of the trunk circuit through a circuit including the closed contacts 3RD3 and 3PT2. The opening of the contacts 3SHS6 interrupts a point in an operating circuit for the release magnet 3DCZ.

At the end of the first open circuit interval representing the first pulse of the dialed party digit, the calling bridge relay 3CB again operates to close and open the contacts controlled thereby so that the contacts 3CB1 and 3CB2 connected in the signaling path of the trunk circuit are again closed, but the closure thereof has no effect due to the closed contacts 3PT1 and 3PT2. The closure of the contacts 2CB2 again completes the operating circuit for the slow-to-release release delay relay 2RD which is maintained operated during the release interval of the calling bridge relay 3CB. The opening of the contacts 2CB1, however, interrupts the above described operating circuit for both the motor magnet 3DC and the mark relay 3MK, thus permitting the magnet 3DC to release in preparation for the next operation thereof. The release of the mark relay 3MK opens the contacts 4MK1 and 5MK1. The opening of the contacts 4MK1 interrupts, at an additional point, the previously interrupted circuit for energizing the mark pulse head 520, and the opening of the contacts 5MK1 interrupts the operating circuit for both the shunt relay 5SH and the second mark pulse relay 5MKS. The shunt relay 5SH, however, is slow-to-release and does not release at this time.

However, the second mark pulse relay 5MKS does release to close the contacts 4MKS1 and to open the contacts 4MKS2. The closure of the contacts 4MKS1 prepares the above described pulsing path for the mark pulse head 520, and the concurrent opening of the contacts 4MKS2 interrupts the above described operating circuit for the drive magnet 530, thereby permitting this magnet to release and to advance the magnetic tape in the trunk recorder 500 a single step. Accordingly, at the end of the first pulse of the dialed party digit, the stepping switch DC has been advanced a single step, a single mark pulse has been recorded on the magnetic tape in the trunk recorder 500, and this magnetic tape has been advanced a single step, the first pulse transmitted to the trunk circuit further causing the operation of the shunt relay 5SH and the shunt slave relay 5SHS.

During the receipt of subsequent impulses in the series of impulses representing the value of the dialed party digit, the trunk circuit operates, as described above, to record additional mark pulses on the mark pulse channel of the tape in the trunk recorder 500 and to advance this tape a single step at the termination of the recording of each of these pulses. Further, the stepping switch DC is advanced a single step in response to each impulse received by the trunk circuit from the extended switch train. Assuming that the calling substation A is located on a terminal per station multiparty line and is assigned the tenth position thereon, the assigned party digit is "0" and, accordingly, a series of ten open circuit intervals in the calling loop circuit is provided so that the calling bridge relay 3CB operates and releases ten successive times during which ten mark pulses are recorded on the magnetic tape in the trunk recorder 500, and this magnetic tape is advanced ten steps. Further, the wipers 2DC1, 2DC2, 2DC3, and 2DC4 of the stepping switch DC are advanced ten steps so that these wipers engage the last contacts in the contact banks associated therewith.

In the interdigit interval following the dialing of the dialed party digit, the trunk circuit conditions the signaling circuit therein for extending switch directing impulses over the output conductors of the trunk circuit to selectively operate the remote switching equipment 300 so as to establish a connection to the called substation B, produces the operation of one or more of the party digit register relays 2ON, 2TO, 2TR, and 2STT in accordance with the value of the dialed party digit, restores the stepping switch DC to its normal position, and records a control or space impulse on the magnetic tape of the trunk recorder 500 immediately following the group of mark pulses representing the value of the dialed party digit, thereby to separate the record of the dialed party digit on the magnetic tape from the record pertaining to the next dialed digit. More specifically, in the interdigit interval following the dialing of the party digit, the slow-to-release shunt relay 5SH releases to close the contacts 2SH1 and 3SH2 and to open the contacts 3SH1, 3SH3, and 5SH1. The opening of the contacts 3SH3 again interrupts the partially prepared operating circuit for the motor magnet 3DC of the stepping switch DC. The opening of the contacts 5SH1 interrupts the operating circuit for the shunt slave relay 5SHS, but this relay is rendered slow-to-release by a circuit including a resistor 521 and a condenser 522 in parallel with the operating winding of the relay 5SHS, and, accordingly, the shunt slave relay 5SHS does not release at this time. The opening of the contacts 3SH1 removes the shunt around the upper winding of the repeat coil 320, and the closure of the contacts 2SH1 completes an operating circuit for the space relay 2SP extending from closed and grounded contacts 2RDT3 through the closed contacts 2SHS2, 2SH1, 2PU6, and 2SD2 to the operating winding of the relay 2SP.

The operation of the relay 2SP closes a plurality of contacts 3SP1 and 4SP1. The closure of the contacts 4SP1 completes a series circuit including the closed contacts 4SPS1, 4SP1, 4CS17, the operating winding of the space pulse head 540, a pair of closed contacts 4CS15 and grounded battery. The completion of this circuit energizes the space pulse head 540 to record a space pulse on the space pulse channel of the magnetic tape in the trunk recorder 500 immediately following the last of the group of ten recorded pulses thereon representing the value of the dialed party digit. The closure of the contacts 3SP1 completes an obvious operating circuit for a second space relay 3SPS which, in operating, opens the contacts 4SPS1 and closes a pair of contacts 4SPS2. The opening of the contacts 4SPS1 interrupts the above described energizing circuit for the space head 540, thereby to terminate the recording of the space pulse, and the concurrent closure of the contacts 4SPS2 completes the energizing circuit described above for the drive magnet 530, thereby to condition the magnetic tape for being advanced a single step.

Referring back to the preceding release of the shunt relay 5SH, the closure of the contacts 3SH2 in response to release of this relay completes an obvious circuit for extending ground through a plurality of closed contacts 2PT4 and 2SHS1 to the wipers 2DC1, 2DC2, and 2DC3 which, as described above, are in engagement with the tenth contacts in the contact banks associated therewith, thus representing the value of the dialed party digit as being "10." The ground applied to the wipers 2DC1, 2DC2, and 2DC3 is simultaneously extended to the operating windings of the party two relay 2TO through a normally closed pair of contacts 2TO2, to the operating winding of the party three relay 2TR through a pair of normally closed contacts 2TR2, and to the operating winding of the parties six–ten relay 2STT through a pair of normally closed contacts 2STT2, thereby causing the simultaneous operation of these three relays. The concurrent operation of these relays provides a manifestation or representation of the value of the dialed party digit "10."

The operation of the party two relay 2TO closes a plurality of contacts 2TO1, 2TO4, 2TO6, 2TO7, and 3TO1 and opens a plurality of contacts 2TO2, 2TO3, and 2TO5. The contacts 2TO1 and 2TO2 form a make-before-break contact arrangement so that the contacts 2TO1 complete a circuit extending to holding ground at the closed contacts 2RD2 through a pair of normally closed contacts 2IC1 prior to the opening of the contacts 2TO2 to interrupt the above described operating circuit for the relay 2TO. The selective operation of the contacts 2TO3 to 2TO6, inclusive, partially prepares a marking path to one of five conductors designated "1 or 6," "2 or 7," "3 or 8," "4 or 9," and "5 or 10" in FIG. 6 of the drawings, which conductors extend to the party matrix switching circuit 600. The closure of the contacts 2TO7 prepares an operating circuit for a party transfer relay 2PT, and the closure of the contacts 3TO1 prepares an operating circuit for the release magnet 3DCZ of the stepping switch DC.

The operation of the party three relay 2TR closes a plurality of contacts 2TR1, 2TR4, 2TR5, and 3TR1, and opens a plurality of contacts 2TR2 and 2TR3. The contacts 2TR1 and 2TR2 form a make-before-break contact arrangement in which the closure of the contacts 2TR1 completes a holding circuit for the relay 2TR extending to ground through the closed contacts 2IC1 and 2RD2 prior to the opening of the contacts 2TR2 to interrupt the above described operating circuit for the relay 2TR. The opening of the contacts 2TR3 interrupts the partially prepared path extending to the conductor designated "2 or 7" by the closure of the contacts 2TO4, and the concurrent closure of the contacts 2TR4 prepares a marking path extending through the closed contacts 2TO6 to the conductor designated "5 or 10," thus indicating that the value of the stored party digit is either "5" or "10" in accordance with the operated or released condition of the parties six–ten relay 2STT. The closure of the contacts 2TR5 prepares a circuit in parallel with the closed contacts 2TO7 for operating the party transfer relay 2PT. The closure of the contacts 3TR1 provides a source of operating ground which is parallel to that provided by the closed contacts 3TO1 in the partially conditioned operating circuit for the release magnet 3DCZ.

The operation of the parties six–ten relay 2STT closes a plurality of contacts 2STT1 and 2STT4 and opens a plurality of contacts 2STT2 and 2STT3. The contacts 2STT1 and 2STT2 form a make-before-break contact arrangement so that the closure of the contacts 2STT1 completes a holding circuit extending to ground through the closed contacts 2IC1 and 2RD2 prior to the opening of the contacts 2STT2 to interrupt the above described operating circuit for the relay 2STT. The opening of the contacts 2STT3 indicates that the value of the stored party digit is not in the range of the digits "1" to "5" by opening an operating path for a one-to-five relay 6OTF in the matrix switching circuit 600, and the concurrent closure of the contacts 2STT4 prepares a circuit for operating an above five relay 6AF, thereby to indicate that one of the two digits represented by the selection of the conductor designated as "5 or 10" is in the range above "5" or has the value of "10."

Although the operation of the party one relay 2ON has not been described in detail, this relay is operated by the stepping switch DC when the value of the stored party digit is "1," "4," "6," or "9" to actuate a plurality of contacts 2ON1, 2ON2, 2ON3, 2ON4, 2ON5, 2ON6, and 3ON1 to perform substantially the same functions as the operation of the relays 2TO and 2TR. Accordingly, the selective operation of one or more of the group of party digit register relays 2ON, 2TO, 2TR, and 2STT establishes partially prepared circuits extending to the party matrix switching circuit 600 in accordance with the value of the stored party digit on one of five conductors, each of which represents a digit equal to or less than "5" and a digit greater in value than "5." The relay 2STT also prepares a circuit on one of two conductors extending to the switching circuit 600 in accordance with whether the registered digit has a value equal to or less than "5" or more than "5," thereby to prepare the switching circuit 600 for selecting a single control component on party matrix in accordance with the register value of the party digit. The relays 2ON, 2TO, and 2TR also prepare operating paths for the reset magnet 3DCZ and the party transfer relay 2PT.

Following a suitable time interval sufficient to cover the above described operations, the shunt slave relay 5SHS, the operating circuit for which was interrupted by the release of the shunt relay 5SHS, releases to open the contacts 2SHS1, 2SHS2, 3SHS1, 3SHS2, and 3SHS5 and to close the plurality of contacts 3SHS3, 3SHS4, and 3SH6. The contacts 3SHS1 remove the shunt around the winding of the supervisory relay 3SR, while the closure of the contacts 3SHS3 and 3SHS4 interconnects this winding of the relay 3SR with the line conductors of the trunk circuit. The opening of the contacts 3SHS5 and 3SHS2 disconnects ground and grounded battery from the line conductors of the trunk circuit. The opening of the contacts 2SHS1 interrupts the above described circuit for supplying ground to the wipers 2DC1, 2DC2, and 2DC3 of the stepping switch DC.

The opening of the contacts 2SHS2 interrupts the above described operating circuit for the space relay 2SP so that this relay releases to open the contacts 3SP1 and 4SP1. The opening of the contacts 4SP1 interrupts at an additional point the above described operating circuit for the space pulse head 540, and the opening of the contacts 3SP1 interrupts the operating circuit for the second space relay 3SPS so that this relay releases to close the contacts 4SPS1 and to open the contacts 4SPS2. The closure of the contacts 4SPS1 prepares the above described operating circuit for the space pulse head 540, and the opening of the contacts 4SPS2 interrupts the above described operating circuit for the drive magnet 530, thereby permitting the drive mechanism to advance the magnetic tape in the trunk recorder 500 a single step following the recording of the space pulse thereon.

Referring back to the above described release of the shunt slave relay 5SHS, the closure of the contacts 3SHS6 completes an operating circuit for the release magnet 3DCZ of the stepping switch DC extending from ground at either of the closed contacts 3TO1 or 3TR1 through the closed contacts 3SHS6, 3PT5, and the closed off-normal contacts 3DC1 of the stepping switch DC. In response to energization of the magnet 3DCZ, the wipers 2DC1, 2DC2, 2DC3, and 2DC4 are mechanically returned to their normal position illustrated in FIG. 2 of the drawings. The energization of the magnet 3DCZ also closes a pair of release magnet springs 4DCZ1 to apply ground to a terminal 405 through a parallel combination of a resistor 407 and an alarm lamp 406. The continuous maintenance of ground on the terminal 405 provides delayed illumination of the lamp 406 to provide a visible indication in the event that the release magnet 3DCZ is not released within a selected period of time.

In restoring the wipers 2DC1, 2DC2, 2DC3, and 2DC4 of the stepping switch DC to their normal home positions, the off-normal contacts 3DC2 are opened, which perform no useful function, and the contacts 3DC1 are opened to release the release magnet 3DCZ so as to open the contacts 4DCZ1. The restoration of the wipers 2DC1–2DC4 to their home positions also completes an operating circuit for the party transfer relay 2PT extending from closed and grounded contacts 3SH2 over the wiper 2DC4 and through the closed contacts 2TO7 and 2TR5 in parallel and a pair of normally closed contacts 2PT1. The completion of this circuit operates the party transfer relay 2PT to indicate the completion of the operations of the trunk circuit in which the party digit is stored in the party digit register relays 2ON, 2TO, 2TR, and 2STT and in which the value of this digit is stored in the trunk recorder 500. In operating, the party transfer relay 2PT conditions the trunk circuit to repeat the next dialed digits from the switch train over the trunk conductors to the remote switching equipment 300, thereby to establish a connection to the called substation B. The party transfer relay further conditions the stepping switch DC to count the number of dialed digits to prevent the transmission of superfluous digits to the trunk recorder 500 and over the trunk circuit to the remote switching equipment 300.

The operation of the party transfer relay closes a plurality of contacts 2PT2, 2PT3, 3PT3, and 5PT1 and opens a plurality of contacts 2PT1, 2PT4, 3PT1, 3PT2, 3PT4, and 3PT5. The contacts 2PT1 and 2PT2 form a make-before-break contact arrangement so that the closure of the contacts 2PT2 completes a holding circuit to the closed and grounded contacts 2RD2 prior to the opening of the contacts 2PT1 to interrupt the operating circuit for the party transfer relay 2PT. The opening of the contacts 2PT4 interrupts, at an additional point, the above described circuit for applying ground to the wipers 2DC1, 2DC2, and 2DC3. The closure of the contacts 2PT3 prepares an operating circuit for a last digit relay 2LD extending to the seventh contact in the contact bank engaged by the wiper 2DC4, thereby preparing the last digit relay 2LD for operation following the transmission of seven digits over the extended switch train to the trunk circuit. The opening of the contacts 3PT1 and 3PT2 conditions the signaling circuit in the trunk circuit for operation by the contacts 3CB1 and 3CB2 controlled by the calling bridge relay 3CB so that dial pulses transmitted to the trunk circuit are repeated over the trunk conductors to the remote switching equipment 300. The closure of the contacts 3PT3 prepares an operating circuit for the motor magnet 3DC of the stepping switch DC so that this switch is enabled to count the digits transmitted to the trunk circuit from the calling substation A, and the concurrent opening of the contacts 3PT4 interrupts the above described operating circuit for the motor magnet 3DC. The opening of the contacts 3PT5 interrupts, at an additional point, the operating circuit for the reset magnet 3DCZ. The closure of the contacts 5PT1 prepares an operating circuit for a clock-calendar relay 5CC. The trunk circuit is now conditioned to receive the series of pulses representing the directory number of the called subscriber B.

Assuming that a conventional "2–5" numbering scheme is utilized, the calling bridge relay 3CB is released in response to the first calling loop circuit interruption produced by dialing the first digit identifying the called substation B, thereby to close the contacts 2CB1 and to open the contacts 2CB2, 3CB1, and 3CB2. The opening of the contacts 3CB1 and 3CB2 produces no useful function at this time, and the opening of the contacts 2CB2 again interrupts the operating circuit for the release delay relay 2RD which does not release at this time due to the slow-to-release characteristic thereof. The closure of the contacts 2CB1 sequentially operates the mark relay 3MK, the second mark relay 5MKS, the shunt relay 5SH, and the shunt slave relay 5SHS, as described above, so as to momentarily energize the mark pulse head 520 to record a single mark pulse on the magnetic tape of the trunk recorder 500 and to energize the drive magnet 530 to condition the magnetic tape for a single step of advancement.

The sequential operation of the shunt relay 5SH and the shunt slave relay 5SHS produces the same functions described above with the following exception. The closure of the contacts 3SHS2 and 3SHS5 extends grounded battery and ground to the now open contacts 3CB1 and 3CB2 controlled by the calling bridge relay 3CB in preparation for providing ground and battery for pulsing the conductors of the trunk circuit extending to the remote switching equipment 300. The closure of the contacts 3SH3 completes the energizing circuit for the motor magnet 3DC so that the contacts 2DC5 are opened and the wipers 2DC1, 2DC2, 2DC3, and 2DC4 are advanced to the first contacts in the contact bank associated therewith, thereby representing the dialing of the first digit of the called subscriber designation. The opening of the contacts 2DC5 produces no useful function at this time. In advancing the switch DC off-normal, the off-normal contacts 3DC1 and 3DC2 are closed. The closure of the contacts 3DC1 prepares an operating circuit for the release magnet 3DCZ, which is now interrupted at the open contacts 3PT5, and the closure of the contacts 3DC2 again provides a source of holding ground for the sleeve lead of the extended connection, which ground is ineffective due to the open contacts 3RDS2.

When the calling bridge relay 3CB is again operated in response to reclosure of the calling loop circuit at the calling substation A, the contacts 2CB2, 3CB1, and 3CB2 are closed, and the contacts 2CB1 are opened. The opening of the contacts 2CB1 releases the mark relay 3MK and the second mark relay 5MKS to permit the magnet 530 to release and thus advance the magnetic tape in the recorder 500 a single step following the recording of the first mark pulse representing the value of the first dialed digit of the called subscriber designation. The closure of the contacts 2CB2 again completes the operating circuit for the release delay relay 2RD. The closure of the contacts 3CB1 and 3CB2 applies grounded battery and ground, respectively, to the conductors of the trunk circuit extending to the remote switching equipment 300, thereby to provide a first switch directing pulse to control the switching equipment 300 in establishing a connection to the called substation B.

When the calling bridge relay 3CB is next released in response to a line interruption, the contacts 2CB1 are again closed to sequentially operate the mark relay 3MK and the second mark relay 5MKS to record a second pulse on the magnetic tape in the trunk recorder 500 and to energize the drive magnet 530 in preparation for advancing the magnetic tape a single step. Further, in operating, the contacts 3CB1 and 3CB2 are again opened to remove grounded battery and ground, respectively, from the conductors of the trunk circuit to terminate the first pulse supplied to the remote switching equipment 300. This intermittent operation and release of the calling bridge relay 3CB continues until such time as the series or group of pulses representing the value of the first dialed digit has been transmitted to the remote switching equipment 300 and also recorded on the magnetic tape in the trunk recorder 500.

In the interdigit interval following the completion of the transmission of this group of impulses, the shunt relay 5SH releases after its slow-to-release interval to open the contacts 3SH3 so as to interrupt the above described operating circuit for the motor magnet 3DC of the stepping switch DC. The switch, in releasing, again closes the interrupter contacts 2DC5 which produces no useful function at this time. Further, as described above, the sequential release of the shunt relay 5SH and the shunt slave relay 5SHS in closing the contacts 2SH1 and in opening the contacts 2SHS2 momentarily energizes the space relay 2SP and the second space relay 3SPS so that a single space pulse is recorded on the magnetic tape of the trunk recorder 500 immediately following the first digit in the designation of the called subscriber B.

In this manner, the calling bridge relay 3CB, the first and second mark relays 3MK and 5MKS, the first and second space relays 2SP and 3SPS, the shunt relay 5SH, the shunt slave relay 5SHS, and the motor magnet 3DC operate during the next six digits transmitted over the extended switch train to the trunk circuit to record the values of these digits on the magnetic tape in the trunk recorder 500 in the form of groups of mark pulses including pulses equal in number to the value of the digit. The dial pulses are further repeated over the trunk circuit to the remote switching equipment 300 to control the establishment of a switch train to the called subscriber B in the remote area. Concurrently therewith, the shunt relay 5SH sequentially advances the stepping switch DC so that the wipers 2DC1, 2DC2, 2DC3, and 2DC4 thereof are advanced over the contacts engaged thereby so that, at the completion of the transmission of this sixth additional digit, or the seventh digit, the wiper 2DC4, together with the other wipers in the switch DC, are positioned in engagemnt with the seventh contact in the contact bank associated therewith. In this position, the wiper 2DC4 is connected to the operating winding of the last digit relay 2LD through a circuit including the closed pairs of contacts 2PT3 and 2LD1. The selective operation of the last digit relay informs the trunk circuit that the proper complement of digits necessary for extending a connection to a remote subscriber, such as the called substation B, has been both transmitted and recorded in the trunk recorder 500, and, accordingly, the last digit relay provides means for preventing the storing of additional digits in the trunk recorder 500 and for likewise preventing the transmission of additional information over the trunk circuit to the remote switching equipment 300.

More specifically, in the interdigit interval following the dialing of the last of the seven digits dialed to obtain access to the called substation B, the shunt relay 5SH releases, as described above, and in doing so closes the contacts 3SH2 to complete an operating circuit for the last digit relay 2LD extending over the wiper 2DC4 through the seventh contact in the bank associated therewith and the closed contacts 2PT3 and 2LD1. Concurrently therewith, the closure of the contacts 2SH1 completes the above described operating circuit extending to the space relay 2SP so that this relay and the second space relay 3SPS sequentially operate to record a space pulse on the tape in the trunk recorder 500 immediately following the seventh dialed digit of the called subscriber designation and to energize the drive magnet 530 to condition the magnetic tape for a single step of advancement.

In operating, the last digit relay closes a plurality of contacts 2LD2, 3LD1, and 3LD2 and opens a plurality of contacts 2LD1, 2LD3, and 5LD1. The contacts 2LD1 and 2LD2 form a make-before-break contact arrangement in which the closure of the contacts 2LD2 completes a holding circuit for the relay 2LD extending to the closed and grounded contacts 2RD2 prior to the opening of the contacts 2LD1 to interrupt the above described operating circuit for this relay. The opening of the contacts 2LD3 interrupts the above described pulsing path for the mark relay 3MK and thus prevents further pulsing of the calling bridge relay 3CB from controlling the recording of information in the trunk recorder 500. The closure of the contacts 3LD1 and 3LD2 provides a shunt around the contacts 3CB1 and 3CB2 controlled by the calling bridge relay 3CB and thus prevents the transmission of additional pulse information to the remote switching equipment 300. The opening of the contacts 5LD1 interrupts the above described operating circuit for the shunt relay 5SH so that further operation of the second mark pulse relay 5MKS incident to recording clock and calendar information and other items of information, such as the designation of the calling substation A, does not produce an accompanying operation of the shunt relay 5SH and the shunt slave relay 5SHS.

The next item of information received by the trunk circuit is supplied from the remote area over the trunk circuit and comprises either steady reverse battery answering supervisory signals or intermittent reverse battery signals indicating a busy condition. The supervisory relay 3SR, which is connected across the conductors from the trunk circuit through the closed contacts 3SHS3 and 3SHS4 and 3LD1 and 3LD2 responds to these signals either to prevent the recording of additional information, in the event that a busy tone is received, or to provide an indication that the necessary additional items of information pertaining to the toll call are to be recorded, in the event that answering reverse battery supervision is received.

Assuming that busy signals are received by the trunk circuit indicating that the connection cannot be completed to the called subscriber B, the supervisory relay 3SR is operated to close a pair of contacts 3SR1 which completes an obvious operating circuit for a second supervisory relay 3SRS extending to the closed and grounded contacts 2RD2. The operation of the second supervisory relay 3SRS closes a pair of contacts 2SRS1 and opens a pair of contacts 2SRS2. The opening of the contacts 2SRS2 interrupts an additional point in the above described pulsing circuit extending to the mark relay 3MK which is controlled by the contacts 2CB1. The closure of the contacts 2SRS1 forwards ground from the closed contacts 2RD2 to the operating winding of a timer clutch 230 forming a portion of the timing mechanism whose drive motor 360 was previously energized by the closure of the contacts 3RD2. This timing mechanism, which is individual to the trunk circuit, preferably is of the type disclosed in the copending application of Armistead Wharton, Serial No. 497,760, filed March 29, 1955, which application is assigned to the same assignee as the present application. In general, the timing mechanism disclosed therein comprises an electric clock motor 360 for driving a mechanical cam arrangement through an intervening clutch 230 so that the cam arrangement is adapted to close a pair of contacts 231 to provide a control pulse or signal at the end of a relatively short interval of time, such as an interval of from one to two seconds, during which a busy test is performed by the trunk circuit to determine the idle or busy condition of the line extending to the called subscriber B. The timing mechanism also includes a pair of normally open contacts 232 which are initially closed to provide a first duration impulse approximately sixty-five to sixty-seven seconds following the energization of the clutch 230 and which thereafter are operated to provide duration impulses at one minute intervals, thereby to provide a means for recording information pertaining to the length of the toll call. This mechanism is such that, in response to termination of the energization of the timer clutch 230, the cam mechanism is immediately returned to its normal starting position so that, upon reenergization of the clutch 230, the contacts 231 and 232 are again closed in the sequence described above.

Therefore, when the timer clutch 230 is energized by the closure of the contacts 2SRS1 in response to operating the second supervisory relay 3SRS, the timing mechanism is placed in operation so that, after an interval of between one to two seconds, the contacts 231 are closed. However, if, as assumed above, a sixty cycle busy flashing signal is being received by the trunk circuit, the supervisory relay 3SR is released to release the second supervisory relay 3SRS before the completion of the timing out of the control timing interval provided by the contacts 231. The release of the second supervisory relay 3SRS opens the contacts 2SRS1 to terminate energization of the timer clutch 230 so that the cam arrangement forming a portion of this timer is immediately restored to a normal condition. Thereafter, the supervisory relays 3SR and 3SRS and the timer clutch 230 are intermittently operated and released in accordance with the busy flashing supplied to the supervisory relay 3SR from the remote switching equipment 300.

This intermittent operation continues until such time as the subscriber at the calling substation A, in response to the receipt of busy tone, opens the calling loop circuit to release the calling bridge relay 3CB, the party transfer relay 2PT, the last digit relay 2LD, and the release delay relays 2RD, 2RDS, and 3RDT and to restore the stepping switch DC to its normal position. Incident to these operations and as described in detail hereinafter, the stepping switch DC cooperates with a pulse assist relay 2PA and an end-of-call relay 2EC to provide a measured or counted number of steps of advancement of the magnetic tape in the trunk recorder 500 immediately following the recording of an end-of-call code representing the end of the items of information pertaining to the incomplete call. The measured run-off of the magnetic tape provides a space between the items of information pertaining to this incomplete call and those pertaining to the next call placed through the trunk circuit.

However, assuming that steady reverse battery answering supervisory signals are received by the trunk circuit from the remote switching equipment 300, the supervisory relay 3SR and the second supervisory relay 3SRS are operated, as described above, to close the contacts 3SR1, 2SRS1, and to open the contacts 2SRS2. The closure of the contacts 2SRS1 energizes the timer clutch 230 so that the cam arrangement is advanced under the control of the timer motor 230 to close the contacts 231 after an interval of between one to two seconds. The closure of the contacts 231 completes an obvious operating circuit for a third supervisory relay 2SRT extending to the closed and grounded contacts 2RD2 through a pair of closed contacts 2SRT3. The operation of the third supervisory relay 2SR indicates the satisfactory completion of the busy test and thus initiates the recording of the remainder of the necessary items of information pertaining to this toll call.

More specifically, the operation of the third supervisory relay 2SRT closes a plurality of contacts 2SRT1, 2SRT2, and 2SRT4 and opens the contacts 2SRT3. The contacts 2SRT3 and 2SRT4 form a make-before-break contact arrangement so that the closure of the contacts 2SRT4 completes a holding circuit extending to the closed and grounded contacts 2RD2 prior to the opening of the contacts 2SRT3 to interrupt the above described operating circuit for the relay 2SRT. The closure of the contacts 2SRT2 provides an alternative path for energizing the timer clutch 230 which is shunted around the contacts 2SRS1 so that, in the event that the connection is released or the line is flashed to intermittently operate and release the relays 3SR and 3SRS, the timer clutch 230 cannot be released to restore the timer to a normal condition. In this manner, the timing of the call is continuously maintained following the expiration of the one to two second interval provided prior to the closure of the contacts 231 and the consequent operation of the third supervisory relay 2SRT.

To initiate the recording of the next date and time item of information in the trunk recorder 500, the closure of the contacts 2SRT1 completes an operating circuit for a pickup relay 2PU extending through a plurality of closed contacts 2PU2, 2IC3, 2CC1, and 2SRT1 to the clock-calendar circuit 220. As described in detail in the above identified copending Clement et al. application, the clock-calendar circuit 220 supplies ground over the above described circuit to operate the pickup relay 2PU, if the clock-calendar circuit 220 is idle at the time that the contacts 2SRT1 are closed. The operation of the pickup relay 2PU closes a plurality of contacts 2PU1, 2PU3, 2PU5, 2PU7, 2PU8, and 5PU1 and opens a plurality of contacts 2PU2, 2PU4, and 2PU6. The contacts 2PU1 and 2PU2 form a make-before-break contact arrangement so that the closure of the contacts 2PU1 completes a holding circuit for the pickup relay 2PU extending to the clock-calendar circuit 220 prior to the opening of the contacts 2PU2 to interrupt the above described operating circuit for this relay. The opening of the contacts 2PU4 interrupts an additional point in the above described pulsing path for the mark relay 3MK, and the concurrent closure of the contacts 2PU5 connects the operating winding of the mark relay 3MK to the clock-calendar circuit 220 so that the mark relay 3MK is now controlled by ground pulses provided by the clock-calendar circuit 220 in accordance with date and time information. The opening of the contacts 2PU6 interrupts the above described pulsing path for the space relay 2SP, and the concurrent closure of the contacts 2PU7 connects the operating winding of this relay to the clock-calendar circuit 220 so that the space relay 2SP and the second space relay 3SPS are conditioned for operation in accordance with pulses supplied by the circuit 220.

The closure of the contacts 2PU8 provides an additional source of holding ground for the release delay relay 2RD to maintain this relay operated and, accordingly, the trunk circuit in an operative condition in the event that the connection is released during the interval that the clock-calendar circuit 220 provides information to the trunk recorder 500. As set forth above, following the completion of the timing of the interval determined by the contacts 231, the call is to be assessed to a subscriber, and, accordingly, additional holding ground means are provided for maintaining the trunk circuit in an operative condition to permit the recording of complete information pertaining to the toll call even though the connection is released by the subscriber.

The closure of the contacts 5PU1 completes a preliminary operating circuit for a clock-calender relay 5CC of the two step type so that this relay operates to close a pair of preliminary make contacts 5CC1 and to open a pair of preliminary break type contacts 2CC1. The closure of the contacts 5CC1 prepares a full operating circuit for the relay 5CC, but this relay does not completely operate until the ground shunt around the right hand operating winding thereof is removed by the opening of the contacts 5PU1. The opening of the contacts 2CC1 prevents reoperation of the pickup relay 2PU following the completion of the transmission of the date and time information from the clock-calendar circuit 220 to the trunk recorder 500.

Referring to the above described operation of the pickup relay 2PU, the closure of the contacts 2PU3 applies ground to the clock-calendar circuit 220 to initiate a cycle of operation thereof during which a plurality of groups of mark pulses representing instant date and time are transmitted over the above described circuit to the operating winding of the mark relay 3MK, thereby to cause the recording of this information in the recorder 550. The clock-calendar circuit 220 also provides a plurality of ground pulses for operating the space relay 2SP to record space pulses on the magnetic tape between adjacent groups of the mark pulses, as described above in conjunction with the recording of the dialed digits representing the designation of the called substation B. When all of the necessary items of information pertaining to date and time have been transmitted from the clock-calender circuit 220, the pickup relay 2PU is released to cause the full operation of the clock-calendar relay 5CC as an indication that all of the date and time information has been transmitted to the trunk recorder 500.

More specifically, in response to the completion of the transmission of the necessary information by the clock-calendar circuit 220 and in the manner described in detail in the above identified copending Clement et al. application, ground is removed from the conductor extending to the holding contacts 2PU1 of the pickup relay 2PU so that this relay releases to open the contacts 2PU1, 2PU3, 2PU5, 2PU7, 2PU8, and 5PU1 and to close the contacts 2PU2, 2PU4, and 2PU6. The opening of the contacts 2PU5 and 2PU7 and the closure of the contacts 2PU4 and 2PU6 interrupt the pulsing paths for the mark and space pulse relays 3MK and 2SP previously extended to the clock-calendar circuit 220 and initiate the preparation of additional circuits extending to these relays. The opening of the contacts 2PU1 and the closure of the contacts 2PU2 interrupt the holding circuit for the pickup relay 2PU and reestablish the above described operating circuit for this relay, the operating circuit, however, being maintained interrupted at the open contacts 2CC1. The opening of the contacts 2PU3 removes start ground from the clock-calendar circuit 220, and the opening of the contacts 2PU8 removes the source of holding ground from the release delay relay 2RD.

However, the opening of the contacts 5PU1 removes the ground shunt around the right hand operating winding of the two step clock-calendar relay 5CC so that this relay now fully operates to close a plurality of contacts 2CC2, 3CC1, and 3CC2. The closure of the contacts 2CC2 reestablishes the holding ground source for the release delay relay 2RD to maintain this relay operated in the event that the connection has previously been released, this relay normally being held operated by the closed contacts 2CB2. The closure of the contacts 3CC1 provides marking ground on a conductor individual to the trunk circuit which extends to the banks of contacts of the switching devices associated with the identifier sender, such as the identifier sender 310, thereby to mark this trunk circuit as requiring the association of an identifier sender. The closure of the contacts 3CC2 extends start ground to a terminal 311 which is connected to an identifier sender allotter (not shown) which preferably is of the type disclosed in the above identified copending Clement et al. application. The application of start ground to the identifier sender allotter causes the allotter to actuate the switch in a preselected idle identifier sender, such as the sender 310, to search for and seize the contact multiples individual to the calling trunk circuit. Accordingly, in response to the completion of the transmission of date and time information, as signified by the release of the pickup relay 2PU and the consequent full operation of the clock-calendar relay 5CC, an automatic calling line identification operation is initiated.

To initiate the automatic calling line identification operation and as described in detail in the above identified copending Clement et al. application, the switching means indicated schematically in conjunction with the block diagram of the identifier sender 310 is placed in operation so that a plurality of wipers **310*a*, 310*b*, 310*c*, and 310*d* step over their associated contact banks with the wiper 310*a* searching for the marking ground provided at the closed contacts 3CC1. When the wiper 310*a* moves into engagement with the contacts grounded by the closed contacts 3CC1, in which position the other wipers 310*b*, 310*c*, and 310*d* likewise engage contact multiples individual to this trunk circuit, the identifier sender 310 forwards ground over the wiper 310*c* to complete an obvious operating circuit for a start identification relay 3SD**.

The operation of the relay 3SD closes a plurality of contacts 2SD1, 2SD3, 2SD4, 3SD2, 3SD3, 3SD4, 3SD6, and 3SD7 and opens a plurality of contacts 2SD2, 3SD1, and 3SD5. The contacts 3SD4 and 3SD5 form a make-before-break contact arrangement so that the closure of the contacts 3SD5 completes a holding circuit for the relay 3SD extending to the closed and grounded contacts 3CC1 prior to the opening of the contacts 3SD4 to interrupt the above described operating circuit for the relay 3SD. The opening of the contacts 3SD1 interrupts the above described operating circuits for the mark relay 3MK, and the concurrent closure of the contacts 3SD2 prepares an operating circuit for this relay extending over the wiper **310*b* to the identifier sender 310 to condition the mark relay 3MK for subsequent operation by ground pulses applied to the wiper 310*b* from the identifier sender 310. The opening of the contacts 2SD2 interrupts the above described operating circuits for the space relay 2SP, and the concurrent closure of the contacts 2SD3 interconnects the winding of this relay with the wiper 310*d* to permit operation of the space relay 2SP in accordance with ground pulses applied to the wiper 310*d* by the identifier sender 310. The closure of the contacts 2SD1 provides an alternative path shunted around the closed contacts 2IC1 for supplying holding ground to the operated ones of the party digit register relays 2ON, 2TO, 2TR, and 2STT. The closure of the contacts 3SD7 prepares an operating circuit for the no-identification relay 3NI. The closure of the contacts 2SD4 provides an additional source of holding ground for the release delay relay 2RD** to maintain this relay operated in the event that the connection is released during the recording of calling line identification information.

The closure of the contacts 3SD6 completes an obvious operating circuit for an identify relay 3ID extending to the ground provided on the wiper 310c so that this relay operates to close the plurality of contacts 2ID1, 2ID2, 2ID3, and 3ID1. The closeure of the contacts 3ID1 provides an additional source of holding ground for the start identification relay 3SD and for extension over the wiper 310a to the identifier sender 310.

The operation of the identify relay 3ID supplies the identification potential for return over the HS lead of the extended switch train to selectively energize the identification matrix circuit 680 and also completes the paths prepared by the selective operation of the party digit register relays 2TO, 2TR, and 2STT for operating the party matrix switching circuit 600 in accordance with the stored value of the dialed party digit. More specifically, the closure of the contacts 2ID2 completes the path extending through the previously closed contacts 2TR4 and 2TO6 to extend grounded battery to the "5 or 10" conductor in the party matrix switching circuit 600. The closure of the contacts 2ID1 extends ground through the closed contacts 2STT4 to complete the operating circuit for the above five relay 6AF so that this relay operates to close a plurality of contacts 6AF1, 6AF2, 6AF3, 6AF4, and 6AF5. The closure of the contacts 6AF5 extends the grounded battery provided on the "5 or 10" conductor to the conductor connected to the operating winding of a cut-through relay 610 associated with the party ten matrix 630 in accordance with the above described position of the calling substation A on the terminal per station multiparty line. The operation of the relay 610 interconnects the party ten matrix 630 with the plurality of common busses extending to the input of the identifier circuit 690, thereby to prepare the identifier circuit 690 for receiving digital information representing the directory number of the tenth party on the terminal per station multiparty line. If the registered party dial is assumed to be "5" rather than "10," the relay 2STT remains released so that the closure of the contacts 2ID1 operates the one-to-five relay OTF to close a plurality of contacts 6OTF1–6OTF5 so that a party five matrix switch relay (not shown) is operated.

The closure of the contacts 2ID3 extends in identification potential from the power supply circuit 210 over the HS lead of the extended switch train through the selector 104 and the finder 102 to the HS multiple of the calling line circuit 100, thereby permitting this potential to be extended over the identification conductor 110 to the terminal 111. The terminal 111, in accordance with the above assumption that the calling substation A is located in the tenth position on a terminal per station multiparty line, is connected to the plurality of party matrices 610, 620, and 630 so that each of these individual party matrices is energized to provide digital information representing the directory numbers of all of the substations on the line terminating in the line circuit 100. However, the output of only the party ten matrix 630 is cut through to the input of the identifier circuit 690, as described above, so that these signals selectively operate the identifier circuit 690 in accordance with the four digits forming the directory number of the calling substation A. The output of the identifier circuit 690 is extended over a cable 691 to the input of the identifier sender 310 so that digit registering components in the sender 310 are operated in accordance with the values of the four digits forming the directory number of the calling substation A.

Referring back to the preceding operation of the start identification relay 3SD, the closure of the contacts 3SD3 completes an operating circuit for an identification complete relay 3IC extending from the closed and grounded contacts 3RDS4. Operation of the identification complete relay 3IC opens a plurality of contacts 2IC1, 2IC3, 2IC5, and 5IC1 and closes a plurality of contacts 2IC2, 2IC4, and 8IC1. The closure of the contacts 3IC1 completes an obvious holding circuit for the slow-to-release identification complete relay 3IC. The closure of the contacts 2IC2 prepares an operating circuit for the space relay 2SP. The opening of the contacts 2IC1 interrupts the above described holding circuit for the operated party digit register relays 2TO, 2TR, and 2STT, but this holding circuit is maintained through the closed contacts 2SD1. The opening of the contacts 2IC5 interrupts, at an additional point, the above described operating circuit for the mark relay 3MK, and the concurrent closure of the contacts 2IC4 prepares a path for operating the mark relay 3MK under the control of the timer contacts 232. The opening of the contacts 2IC3 interrupts, at an additional point, the operating circuit for the pickup relay 2PU, thereby to prevent reoperation of this relay.

The opening of the contacts 5IC1 interrupts the above described operating circuit for the clock-calendar relay 5CC, thereby to release this relay to close the contacts 2CC1 and to open the contacts 2CC2, 3CC1, 3CC2, and 5CC1. The opening of the contacts 5CC1 interrupts, at an additional point, the operating circuit for the clock-calendar relay 5CC. The closure of the contacts 2CC1 prepares a portion of the operating circuit for the pickup relay 2PU, which circuit is interrupted at the open contacts 2IC3. The opening of the contacts 2CC2 removes a source of holding ground for the release delay relay 2RD, but this relay is maintained operated by the ground provided at the closed contacts 2CB2 and 2SD4. Since the identification complete relay 3IC is operated and the clock-calendar relay 5CC released in response to the completion of the association of the identifier sender 310 with the trunk circuit, the opening of the contacts 3CC2 removes start ground from the terminal 311 which is connected to the identifier sender allotter, thereby to restore the allotter to a normal condition. Further, the opening of the contacts 3CC1 removes marking ground from the wiper 310a and holding ground from the relay 3SD, but the closed contacts 3ID1 maintain ground on these circuits.

As described above, in response to the operation of the identify relay 3ID, the party matrix switching circuit 690 is selectively operated in accordance with the paths prepared by the selective operation of the operated party digit register relays 2TO, 2TR, and 2STT to render the party ten matrix 630 effective to supply signals to the identifier circuit 690. The operation of the identify relay 3ID further extends the identification potential over the HS lead to the extended switch train to the terminal 111 which is assumed to be connected in the party ten matrix 630, thereby to energize the input of the identifier circuit 690 in accordance with signals representing the digits forming the directory number of the calling substation A on a terminal per station multiparty line. These signals are conducted over the output cable 691 to the identifier sender 310 to store these digits in the identifier sender 310. In the event that an adequate calling line identification is provided in the identifier sender 310, the sender 310 signals the trunk circuit that the transmission of the stored digits to the trunk recorder 500 may proceed. Alternatively, in the event that satisfactory identification information relating to the calling substation A has not been received by the sender 310, a signal is supplied to the trunk circuit representing a failure in the identification process, which failure forcibly releases the connection and prevents the recording of additional items of information pertaining to the toll call. This latter operation is desirable inasmuch as the failure of the automatic calling line identification means prevents the proper assessment of the toll charge for the call.

Assuming that adequate calling line identification information has not been received from the identifier circuit 690 and stored in the identifier sender 310, the sender 310 operates, as described in detail in the above identified copending Clement et al. application and Harris application, to apply ground to the upper operating winding of a no-identification relay 3NI through the closed contacts 3SD7 to operate this relay to close a plurality of contacts 3NI1 and 3NI3 and to open a pair of contacts 3NI2. The closure of the contacts 3NI3 completes a holding circuit extending to the lower winding of the relay 3NI from the closed and grounded contacts 3RDS4. The closure of the contacts 3NI1 interconnects a terminal 331 with the tip conductor of the extended switch train through a coupling condenser, the terminal 331 being connected to a source of busy tone to provide an audible indication to the subscriber at the calling substation A that the connection cannot be completed. The opening of the contacts 3NI2 opens up the outgoing loop circuit from the trunk circuit, thereby to prevent the extension of the connection to the called subscriber B. In response to the receipt of busy tone, the connection is released by the calling subscriber at the substation A to release the calling bridge relay 3CB and restore the remainder of the operated components in the trunk circuit to a normal condition. Incident to these releasing operations and as described in detail hereinafter, the end-of-call relay 2EC records an end-of-call code comprising simultaneous mark and space pulses on the magnetic tape of the trunk recorder 500, and thereafter the stepping switch DC, the end-of-call relay 2EC, and the pulse assist relay 2PA cooperate to advance the magnetic tape in the trunk recorder 500 a predetermined number of steps controlled by the stepping switch DC.

However, assuming that adequate calling line identification information is received by the identifier sender and, in response to the storage thereof as described in detail in the above identified copending Clement et al. application or in the above identified copending Harris application, the identifier sender 310 supplies resistance ground to the wiper 310*a* which is sufficient to maintain the start identification relay 3SD operated but which is not sufficient to act as marking ground on the contact multiple individual to the trunk circuit with which the wiper 310*a* is in engagement. Further, the identifier sender 310 removes ground from the wiper 310*c* to open the operating circuit for the identify relay 3ID so that this relay releases to open the contacts 2ID1, 2ID2, 2ID3, and 3ID1.

The opening of the contacts 3ID1 removes the source of direct holding ground for the start identification relay 3SD, but this relay remains operated over the resistance ground provided on the wiper 310*a* by the identifier sender 310. The opening of the contacts 2ID1 removes grounded battery from the operating winding of the above five relay 6AF, thereby releasing this relay to open the contacts 6AF1 to 6AF5, inclusive. The opening of the contacts 2ID2 removes grounded battery from the path prepared by the selective operation of the relays 2TO and 2TR extending to the operating winding of the relay 670, thereby releasing this cut-through relay for the party ten matrix 630 and thus effectively disconnecting this matrix from the input of the identifier circuit 690. The opening of the contacts 2ID3 removes the identification potential from the HS lead of the extended switch train and from the energized party matrices, such as the matrices 610, 620, and 630. Accordingly, in response to the release of the identify relay 3ID, the identification matrix circuit 680 and the party matrix switching circuit 600 together with the identifier circuit 690 are effectively released for use in conjunction with the identification of other calling substations.

Incident to the removal of ground from the wiper 310*c* and the consequent release of the identify relay 3ID, the identifier sender 310 initiates the transmission of four groups of mark pulses separated by space pulses to the mark pulse relay 3MK and the space pulse relay 2SP for intermittently operating these relays in conjunction with the second mark relay 5MKS and the second space relay 3SPS to record groups of mark pulses separated by space pulses on the magnetic tape of the trunk recorder 500 in accordance with the values of the digits forming the directory number or designation of the calling substation A. In this manner, the trunk recorder 500 is automatically provided with digits forming the directory number of the calling substation in the event that the identifier sender 310 is provided with adequate identification information by the identifier circuit 690.

Following the completion of the transmission of this digital information from the identifier sender 310 to the trunk recorder 500, resistance ground is removed from the wiper 310*a* to release the start identification relay 3SD. In releasing, this relay opens the contacts 2SD1, 2SD3, 2SD4, 3SD2, 3SD3, 3SD4, 3SD6, and 3SD7 and closes the contacts 2SD2, 3SD1, and 3SD5. The operations of the contacts 3SD4, 3SD5, and 3SD6 prepare the above described operating circuits for the start identification relay 3SD and the identify relay 3ID. The opening of the contacts 3SD7 interrupts the above described operating circuit for the no-identification relay 3NI. The opening of the contacts 3SD2 interrupts the above described operating circuit for the mark relay 3MK, and the concurrent closure of the contacts 3SD1 interconnects the operating winding of the mark relay 3MK with the prepared pulsing path extending to the contacts 232 controlled by the trunk timing mechanism. The opening of the contacts 3SD3 interrupts the above described operating circuit for the identification complete relay 3IC, but this relay remains operated over the holding circuit completed at the contacts 3IC1. The opening of the contacts 2SD3 interrupts the above described circuit extending to the identifier sender 310 for operating the space relay 2SP, and the concurrent closure of the contacts 2SD2 prepares another operating path for the space relay 2SP. The opening of the contacts 2SD4 removes the source of holding ground for the release delay relay 2RD, but this relay is maintained operated by the closed contacts 2CB2.

The opening of the contacts 2SD1 interrupts the above described holding circuit for the operated party digit register relays 2TO, 2TR, and 2STT so that these relays release to restore the contacts controlled thereby to a normal condition. The restoration of the contacts controlled by these relays to their normal condition aids in conditioning the trunk circuit for another cycle of recording operation, but produces no other useful function at this time.

The trunk circuit is now in condition to record duration information in the trunk recorder 500 under the control of the timing mechanism individual to this trunk circuit. The release of the start identification relay 3SD, in closing the contacts 3SD1, prepares a path extending through the closed contacts 2PU4 and 2IC4 to a pair of contacts 232 controlled by the timing mechanism. As designated above, the contacts 232 are first closed after an interval of approximately sixty-five to sixty-seven seconds following the energization of the timer clutch 230 in response to the receipt of answering supervisory signals from the remote switching equipment 300. It will be noted that this interval is five to seven seconds longer than the desired one minute interval at which pulses are to be recorded in the trunk recorder 500 as a representation of the duration of the toll call. However, this additional time interval is added to the first minute to be recorded in trunk recorder 500 to allow for the disconnect time of the switch train in response to the release of the connection at the termination of the toll call. If this interval allowed for disconnect time were not provided, it would be possible for a subscriber to go-on-hook at a time substantially at the end of a metered one minute interval, and the disconnect time of the extended switch train would be such as to permit the recording of an additional one minute duration impulse in the trunk recorder 500, thereby to cause a toll charge to be assessed for an additional minute of conversation time. By the provision of a first pulse representing duration information which is transmitted a time interval following a sixty second interval which is approximately equal to the greatest disconnect time of the switch train, this improper assessment of an additional one minute interval to the subscriber is prevented.

Accordingly, after an interval of between sixty-five to sixty-seven seconds following the receipt of answer supervision, the contacts 232 close to extend ground over the circuit including the closed contacts 2IC4, 2PU4, and 3SD1 to operate the mark relay 3MK and then the second mark relay 5MKS so that a mark pulse is recorded on the magnetic tape in the trunk recorder 500, and the drive magnet 630 is operated to condition the magnetic tape for being advanced a single step. Upon release of the contacts 232, the mark relays 3MK and 5MKS sequentially release to release the drive magnet 530 so that the magnetic tape is advanced a single step following the recording of the first mark pulse. Thereafter, the contacts 232 close at sixty second intervals so that a mark pulse is recorded in the trunk recorder 500 at the end of each one minute interval, thereby to provide a number of mark pulses on the magnetic tape corresponding to the number of one minute intervals that the toll connection was maintained.

The recording operations of the trunk recorder are terminated in response to the release of the extended toll connection, and, incident to the release of the trunk circuit, an end-of-call code comprising simultaneous mark and space pulses is recorded on the magnetic tape to indicate the end of the items of information pertaining to the toll call. The magnetic tape is then advanced a counted number of steps under the control of the pulse assist relay 2PA, the end-of-call relay 2EC, and the stepping switch DC to provide a fixed or predetermined space separating the items of information pertaining to the toll call from the items of information to be recorded pertaining to a succeeding toll call. More specifically, when the calling substation A goes "on-hook," the calling bridge relay 3CB is released to restore the contacts controlled thereby to their normal position, in which position the contacts 2CB2 are opened to interrupt the operating circuit for the slow-to-release release delay relay 2RD.

After a suitable time delay determined by the slow-to-release characteristic of the release delay relay 2RD, this relay releases to restore the contacts controlled thereby to their normal position. The opening of the contacts 3RD1 removes ground from the sleeve lead of the extended switch train to permit the switch train extended to the trunk circuit to restore to its normal condition. The closure of the contacts 2RD1 completes an operating circuit for the space relay 2SP extending through the closed contacts 2RDS2 and 2IC2 so that the space relay 2SP and the second space relay 3SPS are sequentially operated to energize the space pulse head 540 for recording a space pulse on the magnetic tape immediately following the group of mark pulses representing the duration of the toll call. The sequential operation of these relays further energizes the drive magnet 530 to condition the drive mechanism for advancing the magnetic tape a single step.

In opening the contacts 2RD2 in response to the release of the release delay relay 2RD, the source of main holding ground is removed from the trunk circuit so that the relays 2PT, 2LD, 3SR, 3SRS, and 2SRT release to restore their contacts to a normal condition. The release of these relays performs no useful function at this time other than in conditioning the trunk circuit for a cycle of operation as described above. The opening of the contacts 3RD2, 2SRT2, and 2SRS1 terminates operation of the timer to prevent the recording of additional duration information in the trunk recorder 500.

In addition to removing the source of main holding ground from the trunk circuit, the opening of the contacts 2RD2 interrupts the operating circuit for the slow-to-release release delay slave relay 2RDS. This relay, after a suitable time interval, releases to close the contacts 2RDS1, 3RDS1, 3RDS2, and 3RDS3 and to open the contacts 2RDS2 and 3RDS4. The closure of the contacts 2RDS1 prepares an operating circuit for the pulse assist relay 2PA and one operating winding of the differential end-of-call relay 2EC, which path includes the closed contacts 2RDT1 and 2PB1 and extends to the home position contacts in the bank of contacts associated with the wiper 2DC4 of the stepping switch DC. The opening of the contacts 2RDS2 interrupts the above described operating circuit for the space relay 2SP so that this relay and the second space relay 3SPS release to deenergize the drive magnet 530, thereby to advance the magnetic tape in the trunk recorder 500 a single step following the recording of the space pulse disposed after the group of mark pulses representing the duration information. The closure of the contacts 3RDS2 reapplies ground to the sleeve terminal of the trunk circuit extending from either of the closed contacts 3RDT1 or 3DC2. The reapplication of ground to the sleeve lead at this time cannot hold the switch train extended to the trunk circuit inasmuch as the switch train has released in the slow-to-release interval of the release delay slave relay 2RDS following the opening of the contacts 3RD1 described above. However, the reapplication of ground to the sleeve terminal of the trunk circuit at this time prevents the seizure of the trunk circuit for use in recording items of information pertaining to a subsequent toll call until such time as the trunk circuit has been fully restored to its normal condition, the end-of-call code has been recorded in the trunk recorder 500, and the magnetic tape therein advanced to a position conditioned to receive these next items to be recorded. The closure of the contacts 3RDS1 again connects the resistor 351 and the condenser 352 across the repeat coil 320 to provide a termination for the trunk circuit.

The closure of the contacts 3RDS3 completes an operating circuit for the release or reset magnet 3DCZ of the stepping switch DC which extends through the closed contacts 3EC4 and the closed off-normal contacts 3DC1. In response to energization of the magnet 3DCZ, the contacts 4DCZ1 are closed to provide a delayed alarm signal, as described above, and the plurality of wipers 2DC1, 2DC2, 2DC3, and 2DC4 are mechanically restored to their normal home position. In restoring the wipers to their normal position, the contacts 3DC1 and 3DC2 are opened. The opening of the contacts 3DC2 removes one source of ground from the sleeve lead of the trunk circuit, but ground is maintained thereon by the closed contacts 3RDT1. The opening of the contacts 3DC1 interrupts the above described operating circuit for the release magnet 3DCZ so that this relay releases to open the contacts 4DCZ1.

The restoration of the wipers of the stepping switch DC to their normal position conditions this stepping switch for reuse in counting intermittent operations of the drive magnet 530 under the control of the pulse assist relay 2PA so that the magnetic tape is advanced a predetermined distance at the end of the items of information pertaining to each toll call. More specifically, when the wiper 2DC4 is returned to its normal home position, the ground extended thereto from the closed and grounded contacts 3SH2 is extended over the above described operating circuit for the end-of-call relay 2EC and the pulse assist relay 2PA so that these two relays operate.

The operation of the end-of-call relay 2EC closes a plurality of contacts 2EC1, 2EC2, 2EC3, 3EC1, and 3EC3 and opens a plurality of contacts 3EC2, 3EC4, 4EC1, 4EC2, and 5EC1. The closure of the contacts 2EC1 completes an additional operating circuit for the pulse assist relay 2PA extending through the interrupter contacts 2DC5 and also completes a holding circuit for the left hand winding of the differential end-of-call relay 2EC. The closure of the contacts 2EC2 connects the right hand winding of the differential relay 2EC with the fifth and tenth contacts in the bank of contacts associated with the wiper 2DC4. The closure of the contacts 3EC1 provides an additional source of busy ground for the sleeve terminal of the trunk circuit. The opening of the contacts 3EC4 interrupts the above described operating circuit for the release magnet 3DCZ at an additional point and prevents operation of this magnet when the stepping switch DC is operated to count the number of steps of advancement of the magnetic tape in the trunk recorder 500.

The opening of the contacts 4EC1 interrupts an operating circuit for the upper winding of the home relay 4HM to prevent its operation during the performance of the end-of-call operations on the trunk recorder 500 in the event that preceding trunk circuits in the group of trunk circuits with which the trunk circuit shown in FIGS. 2 to 5, inclusive, is associated are being played back. The opening of the contacts 5EC1 prevents operation of the shunt relay 5SH during the following operation of the second mark relay 5MKS, the contacts 5LD1 having been closed in response to the release of the last digit relay 2LD when the release delay relay 2RD was released. The opening of the contacts 4EC2 performs no useful function at this time, as does the opening of the contacts 3EC2. The closure of the contacts 3EC3 completes an obvious operating circuit for the mark relay 3MK so that this relay and the second mark relay 5MKS operate in sequence to momentarily energize the mark pulse head 520, thereby to record a mark pulse on the magnetic tape in the trunk recorder 500 forming a portion of the end-of-call code. Simultaneously therewith, the closure of the contacts 2EC3 completes an obvious operating circuit for the space relay 2SP so that this relay and the second space relay 3SPS operate in sequence to momentarily energize the space pulse head 540, thereby to record a space pulse on the magnetic tape of the trunk recorder 500 concurrently with the recording of the mark pulse thereon to provide an end-of-call code comprising adjacent mark and space pulses.

Referring back to the above described release of the release delay slave relay 2RDS, the opening of the contacts 3RDS4 interrupts the operating circuits for the third release delay relay 3RDT and the identification complete relay 3IC. Both of these relays are slow-to-release so that, after a selected time interval, the identification complete relay 3IC releases to restore the contacts controlled thereby to a normal condition. The restoration of the contacts controlled by the relay 3IC merely aids in conditioning the trunk circuit for another cycle of recording operation, as described above. The release of the third release delay relay 3RDT opens the contacts 2RDT1, 2RDT3, 2RDT4, and 3RDT1 and closes the contacts 2RDT2, 4RDT1, and 4RDT2. The opening of the contacts 2RDT1 interrupts an additional point in the operating circuit for the end-of-call relay 2EC, and the closure of the contacts 2RDT2 applies ground to the terminal 236 to advise the supervisory circuit that the trunk circuit is now in an idle condition. The opening of the contacts 3RDT1 removes one source of holding ground from the sleeve conductor of the trunk circuit, but ground is applied thereto by the closed contacts 3EC1. The closure of the contacts 4RDT1 prepares an operating circuit for the upper winding of the home relay 4HM, which circuit is interrupted at the open contacts 4EC1. The closure of the contacts 4RDT2 together with the opening of the contacts 2RDT3 and 2RDT4 merely aid in returning the trunk circuit to its normal condition.

Referring back to the preceding closure of the contacts 2RDS1 in response to the release of the release delay slave relay 2RDS, the operation of the relay 2PA opens the contacts 5PA1 and closes a pair of contacts 3PA1. The opening of the contacts 5PA1, which occurs substantially simultaneously with the operation of the end-of-call relay 2EC precedes the sequential operation of the space and mark relays 2SP, 3SPS, 3MK, and 5MKS and then prevents the energization of the drive magnet 530 incident to the recording of the simultaneous mark and space pulses forming the end-of-call code. The closure of the contacts 3PA1 completes an obvious operating circuit for the motor magnet 3DC of the stepping switch DC so that the wipers 2DC1, 2DC2, 2DC3, and 2DC4 are advanced a single step into engagement with the first contacts in the banks associated therewith. Incident to moving to this off-normal position, the off-normal contacts 3DC1 and 3DC2 are closed. The closure of the contacts 3DC1 prepares an operating circuit for the release magnet 3DCZ, which circuit is interrupted at the open contacts 3EC4. The closure of the contacts 3DC2 again provides ground to the sleeve terminal of the trunk circuit to maintain it in a busy condition until such time as the stepping switch DC is restored to its normal home position. In moving to its first stepping position, the wiper 2DC4 interrupts the above described operating circuit for the end-of-call relay 2EC and the pulse assist relay 2PA, but these relays do not release at this time inasmuch as holding ground is provided at the closed contacts 2EC1.

The energization of the motor magnet 3DC of the stepping switch DC also opens the interrupter contacts 2DC5 to interrupt the above described operating circuit for the pulse assist relay 2PA extending to the closed and grounded contacts 2EC1. However, this relay is slow-to-release so that, after a suitable time interval to insure the completion of the movement of the wipers 2DC1–2DC4, this relay releases to open the contacts 3PA1 and close the contacts 5PA1. The closure of the contacts 5PA1 completes an operating circuit for the drive magnet 530 extending to either of the contacts 4MKS2 or 4SPS2 which are maintained closed by the operated relays 3SPS and 5MKS. The opening of the contacts 3PA1 interrupts the above described operating circuit for the motor magnet 3DC, thereby releasing this magnet and closing the contacts 2DC5. The closure of the contacts 2DC5 again operates the pulse assist relay 2PA to close the contacts 3PA1 and to open the contacts 5PA1. Opening the contacts 5PA1 interrupts the energizing circuit for the drive magnet 530, thereby advancing the magnetic tape in the trunk recorder 500 a single step. The closure of the contacts 3PA1 again energizes the motor magnet 3DC to advance the wipers 2DC1–2DC4 a single step relative to the contact banks associated therewith.

This intermittent operation continues until such time as the pulse assist relay 2PA is operated for the fifth time to close the contacts 3PA1 and to open the contacts 5PA1. Opening the contacts 5PA1 terminates the fourth energization of the motor magnet 530 so that the magnetic tape in the trunk recorder 500 has now been advanced four single steps following the recording of the end-of-call code. The closure of the contacts 3PA1 again energizes the motor magnet 3DC so that the wipers 2DC1–2DC4 are advanced into engagement with the fifth contacts in the banks associated therewith. The energization of the motor magnet 3DC also opens the interrupter contacts 2DC5 to interrupt the operating circuit for the pulse assist relay 2PA, but this relay remains operated due to the slow-to-release charactristic thereof. In moving into engagement with its fifth contact, the wiper 2DC4 completes a circuit for energizing the right hand winding of the differential end-of-call relay 2EC in such a direction that the relay 2EC is released to open the contacts 2EC1, 2EC2, 2EC3, 3EC1, and 3EC3 and to close the contacts 3EC2, 3EC4, 4EC1, 4EC2, and 5EC1. The connection of the tenth contact in the bank engaged by the wiper 2DC4 to the relay 2EC provides a safety factor to insure the termination of the run-off operation in the event that the relay 2EC fails to release when the fifth contact is engaged.

The opening of the contacts 2EC1 interrupts the operating circuit for the left hand winding of the end-of-call relay 2EC, and the opening of the contacts 2EC2 interrupts the energizing circuit for the right hand winding of the differential relay 2EC, thereby maintaining this relay released. The opening of the contacts 2EC3 releases the space relay 2SP and, accordingly, the second space relay 3SPS. The opening of the contacts 3EC1 removes one source of ground from the sleeve conductor of the trunk circuit, but ground is maintained thereon at the closed contacts 3DC2. The closure of the contacts 3EC2 performs no useful function at this time other than in conditioning the trunk circuit for another cycle of operation, and the opening of the contacts 3EC3 interrupts the operating circuit for the mark relay 3MK so that this relay and the second mark relay 5MKS release. The closure of the contacts 4EC1 prepares an operating circuit for the home relay 4HM, and the closure of the contacts 4EC2 merely aids in conditioning the trunk circuit for a playback cycle of operation. The closure of the contacts 5EC1 again prepares the operating circuit for the shunt relay 5SH, which circuit is not completed due to the opening of the contacts 5MK1.

The closure of the contacts 3EC4 completes an operating circuit for the release magnet 3DCZ to return the wipers 2DC1 to 2DC4, inclusive, to their normal home position, and, in thus being restored, the off-normal contacts 3DC1 and 3DC2 are again opened. The opening of the contacts 3DC1 interrupts the above described operating circuit for the release magnet 3DCZ, and the opening of the contacts 3DC2 removes the last source of ground from the sleeve conductor of the extended switch train, thereby indicating that the trunk circuit is idle to permit its seizure for an additional cycle of operation in which items of information pertaining to a toll call are recorded in the trunk recorder 500, as described above.

Shortly after the end-of-call relay 2EC releases, the pulse assist relay 2PA releases to open the contacts 3PA1 and to close the contacts 5PA1. The opening of the contacts 3PA1 interrupts the operating circuit for the motor magnet 3DC of the stepping switch DC, and the closure of the contacts 5PA1 again prepares an operating circuit for the motor magnet 530. However, the motor magnet 530 is not again energized at this time due to the prior release of the relays 3SPS and 5MKS to open the contacts 4MKS2 and 4SPS2. Therefore, the magnetic tape in the trunk recorder 500 has been advanced four steps in the five steps of operation of the stepping switch DC under the control of the end-of-call relay 2EC and the pulse assist relay 2PA. Accordingly, with the release of the end-of-call relay 2EC and the termination of the intermittent operation of the pulse assist relay 2PA together with the return of the stepping switch DC to its normal position, the restoration of the trunk circuit to its normal condition is completed, and the trunk circuit together with its individually associated trunk recorder 500 is conditioned for either recording items of information pertaining to a succeeding toll call or for a cycle of playback operations in which the items of information stored in the trunk recorder 500 are played back through the playback control circuit 400 to the recording facilities 410.

From the above description, it is apparent that the end-of-call relay 2EC is operated to record the end-of-call code on the magnetic tape, and that the pulse assist relay 2PA and the stepping switch 2DC are placed in intermittent operation to provide a measured run-off of the magnetic tape in the trunk recorder 500 in response to the release of the release delay slave relay 2RDS in closing the contacts 3RDS3 and 2RDS1. As set forth above, the connection extended to the trunk circuit is capable of being released at a number of different points during the recording of the items of information pertaining to a toll call in the trunk recorder 500, i.e. in response to the receipt of busy signal from the called subscriber, in response to the receipt of no-identification signaling from the identifier sender 310, or at any other time during the recording of the information pertaining to the toll call. Since the release delay relay 2RD and the release delay slave relay 2RDS together with the third release delay relay 3RDT are always operated incident to the seizure of the trunk circuit upon initiation of a data recording operation, the release of the trunk circuit at any point in the recording operation, such as those specified above, will produce the sequential release of the release delay relay 2RD, the release delay slave relay 2RDS, and the third release delay 3RDT together with the restoration of the stepping switch DC to its normal position.

It will thus readily be appreciated that in response to each release of the trunk circuit following a complete seizure thereof, the release of the release delay slave relay 2RDS in conjunction with the resetting of the stepping switch DC to its normal position will produce the operation of the end-of-call relay 2EC and the pulse assist relay 2PA to provide the end-of-call code following the recorded group of items of informaiton pertaining to the toll call which may include any or all of the necessary items as indicated above. Further, the operation of the end-of-call relay 2EC and the pulse assist relay 2PA provides a measured run-off of the magnetic tape in the trunk recorder 500 to space the recorded items of information, whether complete or incomplete, from the items of information which are to be recorded in conjunction with the next call placed through the trunk circuit.

It is also possible during the recording of items of information in the trunk recorder 500 that the tape therein will become filled with items of information so that additional items cannot be recorded thereon. This situation gives rise to an emergency playback condition in which the trunk circuit is rendered busy, and the recording facilities 410 and the playback control circuit 400 are placed in operation to search for and seize the trunk circuit having a filled trunk recorder. This operation of the trunk circuit does not form a feature of the present invention and, accordingly, has not been described in detail. However, its operation to perform these functions will be apparent from a consideration of the circuit shown in FIGS. 2 to 5, inclusive, in conjunction with the detailed description of the emergency playback operations set forth in the above identified copending Clement et al. application.

*Operation of the Trunk Circuit During a Routine Playback Operation*

In the routine playback operation, the trunk circuit together with other similar trunk circuits are sequentially seized by switching means forming a part of the playback control circuit 400 so that each of the trunk recorders, similar to the trunk recorder 500, is sequentially associated with the recording facilities 410 through the playback control circuit to cause the items of information stored therein to be transmitted to the recording facilities 410, whereby permanent records of the stored items of information are produced.

More specifically, the recording facilities 410 seize the playback control circuit and thereafter the switching means therein is operated to seize an idle trunk circuit. In the event that the trunk circuit is engaged in recording items of information pertaining to a call or is otherwise busy, this trunk circuit is not seized and, accordingly, is not played back until the next playback operation is initiated. In response to seizure, the trunk circuit cuts through the space pulse head 520 and the mark pulse head 540 to amplifying means provided in the playback control circuit 400, busies itself to prevent seizure, and initiates movement of the magnetic tape in the trunk recorder 500 so that this tape is returned to a position in which the items of information pertaining to the first call recorded on the tape at the effective beginning thereof are in position to be moved adjacent the space pulse head 520 and the mark pulse head 540.

At this time the trunk recorder 500 is conditioned for transmitting information through the playback control circuit 400 to the recording facilities 410. Thereafter, control over movement of the tape in the recorder 500 is transferred to the recording facilities 410 so that the tape is advanced to transmit the items of information pertaining to a single call to the facilities 410. In response to the sensing of the end-of-call signal following the items of information pertaining to the first call, the recording facilities 410 interrupt tape movement until such time as these facilities either are cleared or are operated to produce a permanent record of the transmitted items. Thereafter, the facilities 410 intermittently cause tape movement in the trunk recorder 500 to transmit all of the items of information stored therein.

Following the transmission of all of the stored items on the tape, these items being erased concurrently with their transmission to the recording facilities 410, the playback control circuit operates the switching device therein to seize the next idle trunk circuit. As an incident to seizure of the first trunk circuit, an advancing circuit has been operated to cause the magnetic tape in the next succeeding trunk recorder to be advanced to the position at which the items of information pertaining to the first call recorded thereon are in a position to be sensed by the mark and space pulse heads of this subsequent tape recorder. In this manner, the time delay inherent in returning the magnetic tape in each of the successively played-back trunk recorders to their effective beginning or home position is avoided by causing the tape in the next trunk recorder to be seized to be advanced to its beginning point as an incident to the seizure of the next preceding trunk circuit. However, in the improved advancing circuit of the present invention, this circuit is interrupted in response to encountering a trunk circuit which is engaged in recording items of information pertaining to a toll call, thereby to prevent the advancing circuit from returning the tape in the trunk recorder associated with the trunk circuit next succeeding the busy trunk circuit to its home position so as to busy out a plurality of trunk circuits. The provision of this improvement in the advancing circuit prevents a plurality of trunk circuits from being busied out at any time and to reduce the traffic handling capacity of the toll ticketing system.

As described in detail in the above identified copending Clement et al. application, in response to being placed in operation by the recording facilities 410, the playback control circuit 400 completes an operating circuit for a stepping switch individual thereto including a pair of wipers 400*a* and 400*b* so that these wipers are sequentially advanced along the contacts banks individual thereto to search for and seize an idle trunk circuit. Incident to being placed in operation, a playback start relay (not shown) in the playback control circuit 400 is operated to close, among others, a pair of contacts 4PST1. The closure of these contacts completes an obvious operating circuit for a playback switch relay 4PSW. However, the operating winding of this relay is connected to the wiper 400*a* through a pair of normally closed contacts 4PSW1 so that the playback switch relay 4PSW performs a busy ground test over the wiper 400*a* relative to the trunk circuits to which the switching means has access. In the event that ground is supplied to the wiper 400*a* from the trunk circuit, thus indicating a busy condition, the ground shunt prevents the operation of the playback switch relay and the wipers 400*a* and 400*b* step to the next contacts.

However, assuming that the trunk circuit shown in FIGS. 2 to 5, inclusive, is in an idle condition, a circuit including a plurality of closed contacts 4BS3, 4BY3, 4RDS2, 4ALM6, 4CS4, and 4HM2 extending to an open circuit in the playback control circuit 400 over a common conductor 417, removes the ground shunt for the relay 4PSW so that this relay operates to close a plurality of contacts 4PFW2 and 4PFW3, among others, and to open contacts 4PFW1, among others. The opening of the contacts 4PSW1 opens the above described shunting circuit for the relay 4PSW, and the closure of the contacts 4PSW2 prepares a holding circuit for the relay PSW. The closure of the contacts 4PSW3 completes an operating circuit for a second playback switch relay 4PSWS which, in operating, closes a pair of contacts 4PSWS1, among others. The closure of these contacts completes an obvious operating circuit for a clutch switch relay 4CS in the trunk circuit extending over the wiper 400*b*.

Operation of the clutch switch relay 4CS opens a plurality of contacts 2CS1, 3CS2, 4CS3, 4CS4, 4CS6, 4CS11, 4CS13, 4CS15, and 4CS17 and closes a plurality of contacts 3CS1, 4CS1, 4CS2, 4CS5, 4CS7, 4CS8, 4CS9, 4CS10, 4CS12, 4CS14, 4CS16, 4CS18, and 4CS19. The opening of the contacts 2CS1 removes ground from the terminal 236 to indicate that the trunk circuit is in a busy condition. The closure of the contacts 3CS1 applies ground to the sleeve conductor of the trunk circuit to render the trunk circuit busy and prevent its seizure during the playback operation. The opening of the contacts 3CS2 interrupts, at an additional point, an operating circuit for the third release delay relay 3RDT. The opening of the contacts 4CS3 removes a possible source of busy ground for the conductor 403, and the concurrent closure of the contacts 4CS2 prepares an operating circuit for a clutch switch slave relay 4CSS. The opening of the contacts 4CS4 interrupts the above described circuit over which the busy test is performed by the playback control circuit 400, and the concurrent closure of the contacts 4CS5 applies ground to the conductor 403 from the closed and grounded contacts 4TT2 and 4CSS2 to provide a source of holding ground for the playback switch relay 4PSW in the playback control circuit 400 to hold this relay operated when the contacts 4PST1 are opened.

The opening of the contacts 4CS6 interrupts an already open circuit for applying ground representing an emergency start condition in the trunk circuit to the playback control circuit 400, this circuit including the normally closed contacts 401, 4RD1, and 4BY5 and the normally open contacts 4HM3. The contacts 401 are opened by removal of the trunk recorder 500 to prevent the accidental establishment of an emergency playback condition when the trunk circuit is being tested without the recorder 500 connected. The closure of the contacts 4CS7 prepares a circuit for applying ground to a playback start conductor 418 extending to the playback control circuit 400. The closure of the contacts 4CS8 interconnects the operating winding of an alarm relay 4ALM with the playback control circuit 400, thereby to condition this relay for being operated in the event that an alarm condition arises during the playback operation. The closure of the contacts 4CS19 prepares an operating circuit for a playback relay 4PB.

The operation of the clutch switch relay 4CS, as indicated above, associates the mark pulse head 520 and the space pulse head 540 together with the erase head 550 with the playback control circuit 400 and effectively disassociates these transducing means for the local pulsing circuits provided in the trunk circuit. More specifically, the closure of the contacts 4CS10 connects one side of the winding of the mark pulse head 520 with the playback control circuit 400, and the concurrent opening of the contacts 4CS11 disconnects this side of the winding from grounded battery. The closure of the contacts 4CS12 connects the other side of the head 520 with the playback control circuit 400, and the accompanying opening of the contacts 4CS13 disconnects this side of the winding of the transducing head 520 from the pulsing source in the trunk circuit controlled by the relays 3MK and 5MKS. The closure of the contacts 4CS14 connects one side of the operating winding of the space pulse head 540 with the playback control circuit 400, and the accompanying opening of the contacts 4CS15 disconnects grounded battery from this side of the head 540. The closure of the contacts 4CS18 connects the other side of the winding of the space pulse head 540 with the playback control circuit 400, and the concurrent opening of the contacts 4CS17 disconnects the space pulse head 540 from the local pulsing circuit controlled by the relays 2SP and 3SPS in the trunk circuit. The closure of the contacts 4CS16 connects the winding of the erase head 550 with the playback control circuit 400.

As indicated above, the trunk circuit includes an advance circuit interconnecting the various trunk circuits in a type of series circuit relationship so that initiating a playback operation in one of the circuit operates the next succeeding truck circuit to which the switch means in the playback control circuit 400 has access so that the magnetic tape in the trunk recorder individually associated with this next succeeding trunk circuit is returned to its effective beginning or home position, thereby to increase the speed at which the playback operations can be performed. Accordingly, the closure of the contacts 4CS1 in response to the operation of the clutch switch relay 4CS extends the ground provided on an advance conductor 419 by the playback control circuit 400 through a series circuit extending to the upper operating winding of a home relay 4HM' in the next succeeding trunk circuit, thereby to operate this relay to advance the magnetic tape in the trunk recorder individual to this next succeeding trunk circuit to its normal home position. In a similar manner and assuming that the trunk circuit shown in FIGS. 2 to 5, inclusive, of the drawings is not the first trunk circuit to which the playback control circuit 400 has access, the closure of a pair of contacts 4CS'1 in the trunk circuit immediately preceeding the illustrated trunk circuit forwards ground from the playback control circuit 400 over the advance conductor 419 and through a series of normally closed contacts 4BS1, 4BY1, 4ALM1, 4RDT1, and 4EC1 to complete the operating circuit for the upper winding of the home relay 4HM.

Accordingly, at the time that the clutch switch relay 4CS is operated by the playback control circuit 400 in response to the seizure of the trunk circuit, if the next preceding trunk circuit has previously been played back to cause the closure of the contacts 4CS'1, the home relay 4HM in the trunk circuit is operated at the time of seizure.

The operation of the home relay 4HM closes a plurality of contacts 2HM1, 3HM1, 4HM1, 4HM3, 4HM4, and 5HM1 and opens a plurality of contacts 2HM2 and 4HM2. The closure of the contacts 4HM1 completes a holding circuit for the relay 4HM extending through a pair of closed contacts 4PB1. The closure of the contacts 2HM1 applies ground from the closed and grounded contacts 2RDT2 through a pair of normally closed contacts 2TT1 to a terminal 246 which is connected to a motor high speed terminal in a motor control circuit of the type shown and described in the above identified copending Clement et al. application. This circuit controls the driving speed of the roller which is clutched to the capstan and pinch roller type drive provided in the trunk recorder 500 under the selective control of the clutch magnet 510. By applying ground to the terminal 246, the driving roller is rotated at a high rate of speed unsuitable for transducing operations but capable of returning the magnetic tape to its effective beginning very quickly to reduce the holding time of the trunk circuit. The opening of the contacts 2HM2 interrupts the above described circuit extending to the terminal 236 connected to the common supervisory circuit, thereby to indicate the busy condition of the trunk. It will be noted that this circuit has previously been described as being interrupted at the contacts 2CS1, but the contacts 2HM2 first interrupts this circuit in the event that ground has been supplied to operate the home relay 4HM due to the playback of the preceding trunk circuit. The closure of the contacts 3HM1 applies busy ground to the sleeve conductor of the trunk circuit, thereby to prevent seizure of the trunk circuit during a playback operation. Again it should be noted that the closure of the contacts 3CS1 also applies ground to this sleeve conductor, but, as described above, if the home relay 4HM has been operated due to the playback of a preceding trunk circuit prior to the operation of the clutch switch relay 4CS, the original busy ground is placed on the sleeve conductor in response to the operation of the home relay 4HM.

The opening of the contacts 4HM2 interrupts the path extending to the conductor 417, which circuit has previously been described as being interrupted by the opening of the contacts 4CS4, although it should be understood that this path is first opened by the operation of the relay 4HM if this relay is operated by the advance circuit. The closure of the contacts 4HM3 performs no useful function in being utilized to advise the playback control circuit 400 of the establishment of an emergency playback condition. The closure of the contacts 5HM1 provides a source of holding ground for a first perforation relay 5TF, a second perforation relay 5TS, and a third perforation relay 5TT.

The operation of the home relay 4HM or the operation of the clutch switch relay 4CS, whichever occurs first, also extends ground to the operating winding of the clutch magnet 510, thereby to initiate movement of the magnetic tape in the trunk recorder 500 to its effective home position at high speed in order to ready the trunk recorder 500 for transmitting the recorded items of information pertaining to toll calls through the playback control circuit 400 to the recording facilities 410. More specifically, the closure of either of the pairs of contacts 4HM4 or 4CS9 extends ground from the closed and grounded contacts 4EC2 and 4RDT2 through a plurality of closed contacts 4TT3 and 4CSS4 to the operating winding of the clutch magnet 510. The energization of the magnet 510 clutches the driven roller with the pinch roller and capstan type drive provided in the trunk recorder 500 so that the magnetic tape is advanced at high speed.

This continuous movement of the magnetic tape in the trunk recorder 500 moves either a first perforation or a first conductive portion into a sensing position relative to the sensing device described above so that the contacts 501 are closed to operate a tape contact relay 5TC. The operation of the tape contact relay 5TC closes a plurality of contacts 4TC1 and 5TC1. The closure of the contacts 4TC1 completes an operating circuit for the home relay 4HM extending through the normally closed contacts 4PB1. As described above, the home relay 4HM is operated at this time in the event that the preceding trunk circuit has been played back to close the contacts 4CS'1. However, in the event that the home relay 4HM has not previously been operated at the time that the trunk circuit is seized by the playback control circuit 400, as would be the case if the trunk circuit shown in FIGS. 2 to 5, inclusive, is the first trunk circuit to which the switch means in the playback control circuit 400 has access, the first operation of the tape contact relay 5TC to close the contacts 4TC1 would operate the home relay 4 HM to produce the functions described above.

The closure of the contacts 5TC1 completes a preliminary operating circuit for the two step type first perforation counting relay 5TF extending through the normally closed contacts 5TF2. In its preliminary operation, the relay 5TF closes a pair of preliminary make type contacts 5TF1, thereby to provide a holding and full operating circuit for this relay extending to the closed and ground contacts 5HM1. The relay 5TF does not fully operate at this time due to the ground shunt around the upper operating winding of this relay provided by the closed and grounded contacts 5TC1.

When the continuous drives controlled by the clutch magnets 510 advances the magnetic tape so that the tape contacts 501 are opened to release the tape contact relay 5TC, the contacts 4TC1 and 5TC1 are opened. The opening of the contacts 4TC1 produces no useful function inasmuch as the home relay 4HM is held operated at the closed and grounded contacts 4HM1. The opening of the contacts 5TC1, however, removes the ground shunt around the upper operating winding of the relay 5TF so that this relay now fully operates to open the contacts 5TF2 and to close a pair of contacts 5TF3. The opening of the contacts 5TF2 interrupts the above described operating circuit for the relay 5TF, and the closure of the contacts 5TF3 prepares an operating circuit for the second perforation counting relay 5TS.

When the magnetic tape is advanced so that the second perforation or conductive portion causes the closure of the tape contacts 501 to operate the tape contact relay 5TC, the closure of contacts 5TC1 completes an operating circuit extending through the closed contacts 5TF3 and 5TS2 to partially operate the relay 5TS during which a preliminary make pair of contacts 5TS1 is closed. The closure of these contacts provides a holding and full operating circuit extending to the closed contacts 5HM1 for the second perforation counting relay 5TS. When the tape contact relay 5TC is next released in response to opening the contacts 501, the second perforation counting relay 5TS operates fully to open a plurality of contacts 3TS1 and 5TS2 and to close a plurality of contacts 3TS2 and 5TS3. The opening of the contacts 3TS1 removes ground from the tip terminal of the trunk circuit and is useful in an emergency playback operation in causing the forced release of the connection by interrupting the operating circuit for the calling bridge relay 3CB. However, in a normal playback operation, the opening of the contacts 3TS1 performs no useful function. The concurrent closure of the contacts 3TS2 provides an additional source of busy ground for the sleeve terminal of the trunk circuit. The opening of the contacts 5TS2 interrupts, at an additional point, the preliminary operating circuit for the second perforation relay 5TS, and the concurrent closure of the contacts 5TS3 prepares an operating circuit for the third perforation counting relay 5TT.

Continuing movement of the magnetic tape in the trunk recorder 500 under the control of the clutch magnet 510 moves the third perforation or conductive portion into a sensing position and thus effectively closes the contacts 501 to again operate the tape contact relay 5TC. The closure of the contacts 5TC1, in response thereto, completes the preliminary operating circuit for the third perforation relay 5TT extending through the closed contacts 5TF3, 5TS3, and 5TT2, thereby partially operating this relay to close a pair of preliminary make type contacts 5TT1. The closure of these contacts extends ground from the closed contacts 5HM1 to the upper operating winding of the relay 5TT and thus provides a holding and full operating circuit therefor. When the tape contact relay 5TC is released in response to movement of the third perforation or the conductive portion out of a sensing position, the contacts 5TC1 open to permit the relay 5TT to fully operate and, in doing so, to open a plurality of contacts 2TT1, 4TT1, 4TT2, 4TT3, and 5TT2 and to close a pair of contacts 4TT4.

Since the sensing of the third perforation and the consequent operation of the third perforation counting relay 5TT indicaes that the magnetic tape in the trunk recorder 500 has been advanced to its normal home position in which the items of information pertaining to the first toll call are disposed adjacent the heads 520 and 540 for reproduction thereby, the opening of the contacts 2TT1 removes ground from the terminal 246 to terminate high speed rotation of the motor actuating the drive arrangement controlled by the clutch magnet 510. The removal of ground from the motor high speed control terminal 246 permits the driving roll to be driven at a low speed suitable for transducing operations. The opening of the contacts 4TT2 removes one source of ground from the conductor 403, but ground is maintained thereon by the closed contacts 4CSS2. The opening of the contacts 4TT1 interrupts a point in an open operating circuit for the clutch switch slave relay 4CSS. The opening of the contacts 5TT2 interrupts the above described operating circuit for the third perforation relay 5TT at an additional point. The opening of the contacts 4TT3 removes ground from the clutch magnet 510, thereby to terminate advancement of the magnetic tape in the trunk recorder 500 with the magnetic tape disposed at its effective beginning or home position.

The concurrent closure of the contacts 4TT4 completes an operating circuit for the playback relay 4PB extending through the closed contacts 4CS19. The operation of the playback relay 4PB closes a plurality of contacts 3PB1, 4PB2, 4PB3, and 4PB4 and opens a plurality of contacts 2PB1 and 4PB1. The opening of the contacts 2PB1 interrupts a point in an open circuit for operating the end-of-cell relay 2EC and the pulse assist relay 2PA. The closure of the contacts 3PB1 prepares an operating circuit, interrupted at the open contacts 3CS2, for operating the third release delay relay 3RDT. The closure of the contacts 4PB2 prepares an operating circuit, interrupted at the open contacts 4TT1, for the clutch switch slave relay 4CSS. The closure of the contacts 4PB4 completes a holding circuit for the playback relay 4PB extending to the closed and grounded contacts 4CS9 or 4HM4. The closure of the contacts 4PB3 applies ground from the closed and grounded contacts 4CS7 to the playback start conductor 413, thereby to advise the playback control circuit 400 that the trunk recorder 500 is prepared for a playback operation in having the magnetic tape therein returned to its home position.

The opening of the contacts 4PB1 interrupts the above decribed holding circuit for the home relay 4HM which releases at this time inasmuch as ground has previously been removed from the upper winding by the opening of the contacts 4CS'1 in response to the release of this preceding trunk circuit prior to the seizure of the trunk circuit illustrated in FIGS. 2 to 5, inclusive. In releasing, the home relay 4HM restores the contacts controlled thereby to their normal positions, included in which is the opening of the contacts 5HM1 providing holding ground for the operated perforation counting relays 5TF, 5TS, and 5TT. These relays now release so that the contacts controlled thereby are restored to their normal conditions. These contact operations perform no useful function at this time except for the closure of the contacts 4TT1 which completes an operating circuit for the clutch switch slave relay 4CSS extending from the closed and grounded contacts 4CS2 through the closed contacts 4TT1 and 4PT2. In operating, the clutch switch slave relay 4CSS closes a plurality of contacts 4CSS1, 4CSS3, 4CSS5, and 5CSS1 and opens a plurality of contacts 3CSS1, 4CSS2, and 4CSS4.

The opening of the contacts 3CSS1 interrupts a point in an operating circuit for the third release delay relay 3RDT, and the closure of the contacts 4CSS1 completes a holding circuit for the relay 4CSS extending to the closed and grounded contacts 4CS2. The opening of the contacts 4CSS2 removes the source of holding ground from the conductor 403, but ground is maintained thereon by the contacts 4TT2 which were closed in response to the release of the third perforation counting relay 5TT. The closure of the contacts 4CSS3 provides an alternative source of holding ground for the playback relay 4PB. The opening of the contacts 4CSS4 prevents the reapplication of ground to the operating winding of the clutch magnet 510, and the concurrent closure of the contacts 4CSS5 transfers control over the energization of the clutch magnet 510 to the playback control circuit 500 and the recording facilities 410. The closure of the contacts 5CSS1 provides a new source of holding and operating ground for the perforation counting relays 5TF, 5TS, and 5TT.

As set forth above, the closure of the contacts 4PB3 applies ground from the closed contacts 4CS7 to the playback start conductor 418. In response to the application of ground to this conductor, the playback control circuit 400 connects the winding of an erase relay in series with a common erase conductor extending through the closed contacts 4CS16 to the operating winding of the erase head 550 so that the winding of this head is energized to erase recorded items of information from the magnetic tape in the trunk recorder 500 as this tape is moved past the gap of the head under the control of the selective application of ground to the clutch magnet 510 by the playback control circuit 400 and the recording facilities 410. The playback control circuit 400 causes the application of ground to the clutch magnet 510 for an interval sufficient to transmit all of the items of information pertaining to a single call following which ground is removed until such time as the items of information have been cleared from the recording facilities 410 or have been printed thereby. In response to the completion of the printing or clearing operation, ground is reapplied to the clutch magnet 510 so that the magnetic tape in the trunk recorder 500 is intermittently advanced until such time as all of the items of information stored therein have been transmitted to control the operation of the recording facilities 410.

Following the recording of the last group of items of information stored on the magnetic tape in the trunk recorder 500, the recording facilities 410 and the playback control circuit 400 maintain ground on the conductor extending to the closed contacts 4CSS5 so that the clutch magnet 510 remains energized to continuously advance the magnetic tape therein. This continuous advancement of the magnetic tape moves the first perforation or conductive foil into sensing position so that the tape control contacts 501 are again operated to operate the tape contact relay 5TC to close the contacts 4TC1 and 5TC1. The closure of the contacts 5TC1 completes the above described partial operating circuit for the first perforation counting relay 5TS so that this relay partially operates to close the preliminary make contacts 5TF1, thereby completing a holding and full operating circuit extending to the closed contacts 5CSS1. However, the relay 5TS is not fully operated until such time as the ground shunt around the upper operating winding provided by the closed and grounded contacts 5TC1 is removed. The closure of the contacts 4TC1 attempts to complete an operating circuit for the home relay 4HM, but this circuit is interrupted at the open contacts 4PB1.

When the tape contacts 501 are next opened to release the tape contact relay 5TC, the contacts 4TC1 and 5TC1 are opened, thereby permitting the full operation of the first perforation counting relay 5TF to prepare the operating circuit for the second perforation counting relay 5TS, as described above. When the next perforation or conductive foil portion is sensed by the tape contacts 501, the relay 5TS is again operated. The operation of this relay at this time performs no useful function except in preparing an operating circuit for the third perforation counting relay 5TT, which circuit extends through the closed contacts 5TS3 and 5TT2.

When the magnetic tape in the trunk recorder 500 is returned to its normal home position, as determined by the sensing of the third perforation or conductive foil thereon, the contacts 501 are again closed to operate tape contact relay 5TC to close the contacts 4TC1 and 5TC1. The closure of the contacts 5TC1 partially operates the third perforation counting relay 5TT so that the preliminary make type contacts 5TT1 are closed to complete a holding and full operating circuit for this relay extending to the closed and grounded contacts 5CSS1. As the third perforation or third conductive foil portion is moved past the tape sensing position, the contacts 501 open to again release the relay 5TC to open the contacts 4TC1 and 5TC1, at which time the third perforation counting relay 5TT operates fully, as described above, to open the contacts 2TT1, 4TT1, 4TT2, 4TT3, and 5TT2 and to close the contacts 4TT4. The operations of the contacts 2TT1, 4TT1, 4TT3, 4TT4, and 5TT2, perform no useful function at this time.

Since the operation of the third perforation counting relay 5TT indicates that the magnetic tape in the trunk recorder 500 has been returned to its home position, thus effectively terminating the playback operation, the opening of the contacts 4TT2 advises the playback control circuit 400 to release the trunk circuit shown in FIGS. 2 to 5, inclusive, and to search for and seize the next idle trunk circuit, such as the succeeding trunk circuit in which the homing relay 4HM' has been operated. In this connection, it should be noted that the playback control circuit 400 shown and described in detail in the above identified copending Clement et al. application is actuated to release a trunk circuit following a playback operation under the control of time responsive means which interrupt the above described holding circuit for the playback switch relay 4PSW in response to an absence of pulses from the trunk recorder 500 for a selected period of time. However, the present trunk circuit is adapted to be released by the playback control circuit 400 only after the magnetic tape in the trunk recorder 500 has been returned to its home position.

Accordingly, the opening of the contacts 4TT2, as described above, removes ground from the circuit extending through the closed contacts 4CS5, 4ALM6, 4RDS2, 4BY3, and 4BS3, the conductor 403, the wiper 400*a* and the closed contacts 4PSW2 to the operating winding of the playback switch 4PSW. The release of this relay opens the contacts 4PSW2 and 4PSW3 and closes the contacts 4PSW1. The opening of the contacts 4PSW2 interrupts an additional point in the holding circuit for the playback switch relay 4PSW, and the opening of the contacts 4PSW3 interrupts the above described operating circuit for the second playback switch relay 4PSWS, which, in being slow-to-release, does not release at this time. The closure of the contacts 4PSW1 prepares the above described test circuit extending to the wiper 400*a* for permitting the playback control circuit 400 to seize only idle trunk circuits. In addition, by the operation of contacts not shown, the release of the playback switch relay 4PSW prepares the stepping switch including the wipers 400*a* and 400*b* for operation to search for and seize the next idle trunk circuit to which these wipers have access. After the interval determined by the slow-to-release characteristic of the second playback switch relay 4PSWS, this relay releases to open the contacts 4PSWS, thereby interrupting the above described operating circuit for the clutch switch relay 4CS so that this relay releases. Incident to the release of the relay 4PSWS, the operating circuit for the motor magnet of the stepping switch including the wipers 400*a* and 400*b* is released to permit these wipers to advance a single step. In the event that the wiper 400*a* engages ground, the stepping switch in the playback control circuit 400 continues to step until such time as the wiper 400*a* encounters an open circuit at the contacts connected thereto, thereby indicating an idle trunk circuit.

The release of the clutch switch relay 4CS restores the contacts controlled thereby to their normal position. This contact restoration largely returns control over the mark head 520, the space head 540, and the erase head 550 to the trunk circuit and, in general, aids in restoring the trunk circuit to its normal condition. The opening of the contacts 4CS2 interrupts the holding circuit for the clutch switch slave relay 4CSS, but this relay does not release at this time due to the slow-to-release characteristic thereof. The closure of the contacts 3CS2 prepares an operating circuit for the third release delay relay 3RDT, which is interrupted at the open contacts 3CSS1.

After its slow-to-release interval, the clutch switch slave relay 4CSS releases to close the contacts 3CSS1, 4CSS2, and 4CSS4 and to open the contacts 4CSS1, 4CSS3, 4CSS5, and 5CSS1. The opening of the contacts 4CSS1 interrupts the above described holding circuit for the relay 4CSS at an additional point. The opening of the contacts 4CSS5 interrupts the above described circuit for applying ground to the clutch magnet 510, thereby to insure its release and the end of continuous movement of the magnetic tape in the trunk recorder 500. The concurrent closure of the contacts 4CSS4 prepares a local circuit for controlling operation of the clutch magnet 510, but this circuit is interrupted at the open contacts 4TT3. The closure of the contacts 4CSS2 prepares a circuit for applying ground to the conductor 17, which circuit is interrupted at the open contacts 4CS5, and the concurrent opening of the contacts 4CSS3 interrupts the above described holding circuit for the playback relay 4PB, but this relay does not release at this time due to the slow-to-release characteristic thereof. The opening of the contacts 5CSS1 removes holding ground from the perforation and counting relays 5TF, 5TS, and 5TT so that these relays release to restore the contacts controlled thereby to their normal condition. These contact restorations merely aid in restoring the trunk circuit to its normal condition and perform no useful function at this time.

The closure of the contacts 3CSS1 completes an operating circuit for the third release delay relay extending through the closed contacts 3CS2, 3PB1, and 3CSS1, thereby operating this relay. The contact operations produced by the operation of the relay 3RDT perform no useful function at this time, except for the closure of the contacts 2RDT1 and 3RDT1. The closure of the contacts 3RDT1 provides a source of busy ground extending to the sleeve terminal of the trunk circuit. The closure of the contacts 2RDT1 prepares an operating circuit for the end-of-call relay 2EC and the pulse assist relay 2PA, which circuit is interrupted at the open contacts 2PB1.

After its slow-to-release interval, the playback relay 4PB releases to open the contacts 3PB1, 4PB2, 4PB3, and 4PB4 and to close the contacts 2PB1 and 4PB1. The operations of the contacts 4PB1 to 4PB4, inclusive, perform no useful function at this time except in aiding in restoring the trunk circuit to its normal condition. The opening of the contacts 3PB1, however, interrupts the above described operating circuit for the third release delay relay 3RDT, but this relay does not release at this time due to the slow-to-release characteristic thereof. The closure of the contacts 2PB1 completes the above described operating circuits for the end-to-call relay 2EC and the pulse assist relay 2PA so that these relays operate to record an end-of-call code at the effective beginning of the magnetic tape and to thereafter provide a measured tape "run-off" for spacing the end-of-call code from the point on the magnetic tape in the trunk recorder 500 at which the items of information pertaining to the first toll call are to be recorded.

More specifically, the operation of the end-of-call relay 2EC closes the contacts 2EC1, 2EC2, 2EC3, 3EC1, and 3EC3 and opens the contacts 3EC2, 3EC4, 4EC1, 4EC2, and 5EC1. The closure of the contacts 2EC1 provides a holding circuit for the end-of-call relay 2EC and a source of operating ground for the pulse assist relay 2PA. The closure of the contacts 2EC2 connects the right hand operating winding of the differential end-of-call relay 2EC with the fifth and tenth contacts in the contact bank engaged by the wiper 2DC4 of the stepping switch DC. The closure of the contacts 2EC3 completes an obvious operating circuit for the space relay 2SP so that this relay and the second space relay 2SPS operate to record the space pulse portion of the end-of-call code. The closure of the contacts 3EC3 completes an obvious operating circuit for the mark relay 3MK so that this relay and the second mark relay 5MKS operate simultaneously with the space relays to record the mark pulse portion of the end-of-call code. The opening of the contacts 4EC1 interrupts the operating circuit for the home relay 4HM, thereby to prevent operation of this relay until the end-of-call sequence of operation is completed, and the opening of the contacts 3EC4 interrupts an operating circuit for the reset magnet 3DCZ, which circuit is interrupted at the open contacts 3DC1. The remainder of the contact operations produced by the operation of the end-of-call relay 2EC perform no useful function at this time, the closure of the contacts 3EC1 providing an additional source of busy ground for the sleeve terminal of the trunk circuit.

The operation of the slow-to-release pulse assist relay 2PA opens the contacts 5PA1 and closes the contacts 3PA1. Since the contacts 5PA1 are opened prior to the closure of either of the contacts 4MKS2 or 4SPS2, the opening of the contacts 5PA1 prevents the energization of the step drive magnet 530 due to operation of the second space relay 3SPS and the second mark relay 5MKS. The closure of the contacts 3PA1 completes an obvious operating circuit for the motor magnet 3DC of the stepping switch DC so that the wipers 2DC1–2DC4 are advanced a single step. In addition, in moving-off-normal, the wipers close the off-normal switches 3DC1 and 3DC2 so that busy ground is provided at the closed contacts 3DC2 to the sleeve terminal of the trunk circuit. The closure of the contacts 3DC1 prepares an operating circuit for the release magnet 3DCZ, which circuit is interrupted at the open contacts 3EC4. Further, the energization of the motor magnet 3DC opens the interrupter contacts 2DC5 so that, after the slow-to-release interval of the pulse assist relay 2PA, this relay releases to close the contacts 5PA1 and to open the contacts 3PA1, the closure of the contacts 5PA1 energizing the drive magnet 530.

The stepping switch DC, the pulse assist relay 2PA, and the end-of-call relay 2EC thereafter operate to space out the magnetic tape in the trunk recorder 500 a specific number of steps as determined by the interconnection of the right hand operating winding of the end-of-call relay 2EC with the contacts engaged by the wiper 2DC4. Following the counting of the selected number of step-by-step movements, the end-of-call relay 2DC is released by energizing the right hand operating winding thereof, thereby terminating intermittent operation of the stepping switch DC and of the pulse assist relay 2PA. Further, incident to the release of the end-of-call relay 2EC, the relays 2SP, 3SPS, 3MK, and 5MKS are restored to a normal condition, the reset magnet 3DCZ is energized to restore the stepping switch DC to its normal position, and the trunk circuit is returned to an idle condition by the removal of ground from the sleeve terminal.

*Test Facilities in the Trunk Circuit*

It is often desirable to test the adequacy of the operation of the pulse repeating components in the trunk circuit and also to be able to dial a complete test call into the trunk recorder 500 as a means for checking on the operation of the trunk circuit. Accordingly, the trunk circuit includes a plurality of test jacks by which direct interconnection can be made to the trunk circuit to test these operations.

More specifically, in order to dial a complete test call into the trunk circuit for storage in the trunk recorder 500, a test jack 340 is provided having tip, ring, and sleeve springs 343, 344, and 341, respectively, which are connected to the similarly designated incoming leads to the trunk circuit. If a test telephone set is connected to the jack 340, it is possible to audibly monitor signals being dialed into the trunk circuit over an extended switch train much in the same manner that the insertion of a test telephone set into a jack 350 provided across the outgoing conductors of the trunk circuit which includes tip, ring, and sleeve springs 352, 353, and 351, respectively, provides a means for audibly monitoring signals being repeated over the trunk to the remote switching equipment 300. However, if it is desired to utilize a test telephone set in conjunction with the jack 340 to dial data pertaining to a test call directly into the trunk circuit for storage in the trunk recorder 500, it is necessary to operate a busy key BY not only to prevent seizure of the trunk circuit during the direct dialing of the test data but also to permit the recording of all of the data normally stored in conjunction with a conventional toll call to be recorded in the trunk recorder 500 in conjunction with data pertaining to a test call.

More specifically, as described above, if the identifier circuit 690 and the identifier sender 310 fail to provide adequate calling subscriber identification information, the no-identification relay 3NI is operated to prevent the recording of additional items of information pertaining to a toll call. Normally, it would not be possible to direct dial test call data into the trunk circuit for storage in the trunk recorder 500 inasmuch as the absence of a switch train extending to the trunk circuit would prevent operation of the identifier circuit 690 and the identifier sender 310 to provide calling subscriber information, and, accordingly, the no-identification relay 3NI would operate to prevent the storage of further information in the trunk recorder 500. This difficulty is overcome in the trunk circuit of the present invention by interconnecting the test jack 340 with one spring of the busy key BY to provide a means for establishing marking conditions in the identification matrix circuit 680 corresponding to an arbitrary calling line identification utilized only in conjunction with test calls.

In recording data pertaining to a test call, the telephone test set is inserted in the jack 340 with the springs 343 and 344 connected across a test telephone set, thereby to compelete the operating circuit for the calling bridge relay 3CB and the accompanying operations of the relays in the trunk circuit described above under the heading, "Operation of the Trunk Circuit to Record Information in the Trunk Recorder 500." In addition, insertion of a plug into the test jack 340 closes a pair of contacts 342 so that a terminal 332 is connected to a pair of contacts 3BY3 on the manually operated busy key BY. The terminal 332 is connected directly to the private line and terminal per line matrix 640 so that the matrix 640 will supply signals, upon energization, representing an arbitrary calling line designation, which designation is not assigned to any of the subscribers and is utilized solely in conjunction with test calls. When the locking type busy key BY is operated, a plurality of contacts 2BY1, 3BY2, 4BY1, 4BY3, and 4BY5 are opened and a plurality of contacts 3BY1, 3BY3, 4BY2, and 4BY4 are closed.

The closure of the contacts 3BY1 connects ground to the sleeve terminal of the trunk circuit and thus prevents its seizure by any of the selectors, such as the selector 104, having access thereto. The concurrent opening of the contacts 3BY2 interrupts the above described circuits for applying ground to this sleeve terminal. The opening of the contacts 2BY1 removes ground from the terminal 236 and thus indicates to the supervisory circuit that the trunk circuit is in a busy condition. The closure of the contacts 4BY4 applies ground to the conductor 403 to prevent seizure of this trunk circuit by the playback control circuit 400. The concurrent opening of the contacts 4BY3 interrupts the above described circuits connecting the conductor 403 with the trunk circuit. The opening of the contacts 4BY5 prevents the application of emergency start ground to the playback control circuit 400 and thus prevents the establishment of an emergency playback condition. The opening of the contacts 4BY1 interrupts the above described circuit for forwarding ground to the upper operating winding of the home relay 4HM due to closure of the contacts 4CS'1 in the preceding trunk circuit. The concurrent closure of the contacts 4BY2, however, forwards any ground provided by the preceding trunk circuit to the upper operating winding of the relay 4HM' in the next succeeding trunk circuit so that, when the busy key BY is operated and a playback operation is initiated, as soon as the contacts 4CS'1 in the preceding trunk circuit are closed, the ground on the advance conductor 419 is effectively forwarded in a series circuit relationship through the trunk circuit to the next succeeding trunk circuit to operate the home relay 4HM' herein. This operation is to be distinguished from those instances in which the trunk circuit shown in FIGS. 2 to 5, inclusive, is made busy during a recording operation wherein the contacts 4RDT1 are opened to prevent the operation of the home relay 4HM. In this event, ground is not forwarded to the relay 4HM' in the succeeding trunk circuit.

The closure of the contacts 3BY3 connects the contacts 2ID3, which are connected to the power supply circuit 210, through the contacts 342 closed by inserting a plug into the test jack 340 to the terminal 332 which is connected to the private line and terminal per line matrix 340. This conditions the trunk circuit for causing the registration of digits in the identifier sender 310 representing an arbitrary calling subscriber designation during the storage of data pertaining to a test call in the trunk recorder 500.

The trunk circuit is now conditioned for the dialing of digits directly into the trunk circuit for recording in the trunk recorder 500 inasmuch as provision has been made for supplying an artificial calling subscriber designation to the identifier sender 310 and for busying out the trunk circuit to prevent its seizure for either a playback operation or for association with a calling substation such as the substation A. Operation of the test telephone set connected to the test jack 340 thereafter pulses the calling bridge relay 3CB so that items of information pertaining to a test call are directly dialed into the trunk circuit for recording on the trunk recorder 500 in a manner described above in detail under the heading "Operation of the Trunk Circuit to Record Information in the Trunk Recorder 500." The operation is the same as that described above except that, when the contacts 2ID3 are closed in response to operation of the identify relay 3ID, the identification potential provided by the power supply circuit 210 is forwarded through the closed contacts 3BY3 and 342 to the terminal 332 and from this terminal to the private line and terminal per line matrix 640 so as to energize the input to the identifier circuit 690 in accordance with the artificial calling subscriber designation. Manifestly, if desired, the terminal 332 could be connected to a particular one of the terminal per station matrices, such as 610, 620, and 630, and the dialed party digit stored in the party digit register relays 2O and 2TO, 2TR, and 2STT would be selected such as to select the one of the party matrices to which the terminal 332 is connected.

Following the completion of the storage of all of the items of information pertaining to the test call in the trunk recorder 500, the telephone test set is removed from the test jack 340, thereby releasing the calling bridge relay 3CB so that the trunk circuit and the trunk recorder 500 are restored to their normal condition, as described in detail above. Further, following the removal of the telephone test set from the jack 340, the locking busy key BY is released to restore the contacts controlled thereby to their normal condition and thus terminate the busy condition of the trunk circuit. Although the operation of the busy key BY has been described in conjunction with the use of the test jack 340, it is obvious that manual operation of the busy key BY at any time will result in rendering the trunk circuit busy and thus preventing its seizure either for use in recording items of information pertaining to a toll call or for use during a playback operation.

In order to test the pulsing characteristics of the mark relays 3MK and 5MKS and the space relays 2SP and 3SPS, a mark pulse test jack 370 and a space pulse test jack 380 are provided. These jacks permit the above identified mark and space relays to be directly driven from a pulsing source. To provide an indication of the pulsing operation of these relays, a monitoring instrument is inserted in a test jack 560 including tip, ring, and sleeve springs 562, 564, and 561, respectively. When a monitoring device is inserted in the test jack, the monitoring instrument is connected to the spring 562 which receives pulses controlled by the contacts 4MKS2 or 4SPS2 in accordance with the selective operation of the space or mark pulse relays. Concurrently with completing a connection of the monitoring apparatus to the spring 562, the contacts 563 are opened to prevent the transmission of these test pulses to the drive magnet 530 in the trunk recorder 500. The test equipment is also arranged so that a connection is completed to the sleeve spring 561 which is connected to the springs 2CB2 controlled by the calling bridge relay 3BC. By connecting a pulsing source to the test jack 340 to pulse the calling bridge relay 3CB, the intermittent operation of the contacts 2CB2 pulses the monitoring or test apparatus connected to the sleeve spring 561, thereby to provide a check over the adequacy of the operation of the calling bridge relay 3CB. The ring spring 564 in the test jack 560 is connected to the HS conductor of the trunk circuit so as to provide a means for monitoring the presence of the identification potential provided by the power supply circuit 210 upon closing the contacts 2ID3.

In addition to the manually operated busy key BY which is provided for rendering the trunk circuit busy, the trunk circuit is further provided with an E plug busy switch BS including a plurality of contacts 3BS1, 4BS2, and 4BS4 which are opened and a plurality of contacts 3BS2, 4BS1, and 4BS3, which are closed in response to removal of the trunk circuit. The closure of these contacts performs the same functions as the corresponding springs on the busy key BY, thereby to provide conditions representing a busy trunk circuit and to prevent the playback control circuit 400 or a selector, such as the selector 104, from attempting to seize the removed trunk circuit.

*Alarm Facilities in the Trunk Circuit*

The trunk circuit further includes means controlled by an alarm relay 4ALM for rendering the trunk circuit busy and, accordingly, preventing its seizure for either a data recording or playback operation in response to the establishment of alarm conditions. As described in detail in the above identified copending Clement et al. application, an alarm condition may be established in the playback control circuit 400 due to a failure of the playback control circuit 400 and the recording facilities 410 to complete the seizure of the trunk circuit or in response to the failure of the trunk recorder 500 to supply data pertaining to a toll call within a selected time interval. In the event that an alarm condition is established, ground is supplied by the playback control circuit 400 to a conductor 423 which is extended over the closed contacts 4CS8 to complete an obvious operating circuit for the alarm relay 4ALM.

In operating, the relay 4ALM closes a plurality of contacts 3ALM1, 4ALM2, 4ALM4, 4ALM5, 4ALM7, and 4ALM8 and opens a plurality of contacts 4ALM1, 4ALM3, and 4ALM6. The closure of the contacts 4ALM completes an obvious holding circuit for the alarm relay 4ALM extending to a pair of normally closed and grounded contacts 4ALMK1 on a manually operated alarm key ALMK. In order to busy the trunk circuit and, accordingly, to prevent its seizure for recording operations during the establishment of the alarm condition, the closure of the contacts 3ALM1 applies ground to the sleeve terminal of the trunk circuit. Since the trunk circuit is in an alarm condition and cannot be played back, the opening of the contacts 4ALM1 interrupts the above described advancing circuit extending to the upper winding of the home relay 4HM to prevent the operation of this relay incident to a playback operation in the preceding trunk circuit. The concurrent closure of the contacts 4ALM2 extends the ground provided on the advance conductor 419 to the operating winding of the home relay 4HM' in the next succeeding trunk circuit so that this trunk circuit is conditioned for a playback operation. Similarly, the opening of the contacts 4ALM3 prevents the initation of a manually controlled playback operation upon operation of a playback key PBK to close a pair of normally open contacts 4PBK1. The closure of the contacts 4ALM4 applies ground to the terminal 405 to provide an indication in the supervisory equipment of the alarm condition in the trunk circuit.

The opening of the contacts 4ALM6 removes the holding ground supplied to the conductor 403 and the holding circuit for the playback switch relay 4PSW in the playback control circuit 400, thereby permitting this relay to release to open the contacts 4PSW2 and 4PSW3 and to close the contacts PSW1. The opening of the contacts 4PSW2 and the closure of the contacts 4PSW1 completes the above described test circuit for controlling the operation of the switching means in the playback control circuit 400, thereby to cause the switch including the wipers 400*a* and 400*b* to search for the next idle trunk circuit. The opening of the contacts 4PSW3 interrupts the operating circuit for the second playback switch relay 4PSWS so that, after a time interval determined by the slow-to-release characteristic thereof, this relay releases to permit the stepping switch including the wipers 400*a* and 400*b* to advance a single step and to open the contacts 4PSWS1. Opening the contacts interrupts the above described operating circuit for the clutch switch relay 4CS so that this relay releases to disconnect the trunk circuit from the playback control circuit 400. Incident to these operations, the release of the relay 4CS opens the contacts 4CS8 to interrupt the above described operating circuit for the alarm relay 4ALM, but this relay remains operated over the holding circuit completed through the closed contacts 4ALM7. The remainder of the contact operations produced by the release of the clutch switch relay 4CS merely aid in restoring the trunk circuit to a normal condition, as described above.

The above described operation of the alarm relay 4ALM, considered together with the release of the clutch switch relay 4CS to close the contacts 4CS3, completes a circuit for applying ground to the conductor 403 to indicate that the trunk circuit is in a busy condition and thus prevent its seizure for playback during the alarm condition. The closure of the contacts 4ALM8, in response to operation of the alarm relay 4ALM, applies resistance ground to a conductor 424 which extends to the playback control circuit 400. As described in detail in the above identified copending Clement et al. application, the application of resistance ground to the playback control circuit 400 is not sufficient to take this circuit out of operation, but, in the event that two trunk circuits are placed in an alarm condition incident to a playback operation, the ground provided through two parallel resistances is sufficient to establish an alarm condition in the playback control circuit 400 and, accordingly, to place this component out of operation.

The alarm relay 4ALM remains operated until such time as it is manually released by operating the key 4ALMK to open the contacts 4ALMK1. In response to release of the alarm relay 4ALM, the trunk circuit is restored to its normal condition in which it is capable of being seized for use in both recording and playback operations.

Although the trunk circuit of the present invention is described above in conjunction with particular means for selecting, storing, and recording data pertaining to toll calls, it should be understood that many other modifications and embodiments may be provided by those skilled in the art which will fall within the spirit and scope of the principles of the present invention.

What is claimed and desired to be secured by Letters Patent of the United States is:

1. In an automatic toll ticketing system, a calling line, a trunk circuit, first switching means for extending a connection from said calling line to said trunk circuit, a storage device individual to said trunk circuit and including a record medium, recording means in said storage device disposed adjacent said medium, drive means in said storage device for advancing said medium, first control means in said trunk circuit operated by the extension of a connection to said trunk circuit for conditioning said recording means and said drive means for operation under the control of applied signals to record data on and to advance said medium during the extension of the connection so that data pertaining thereto is stored on said medium, means for operating said first switching means to release said trunk circuit, means responsive to the release of said trunk circuit for rendering said first control means ineffective to control said drive means and said recording means, second control means operated in response to the release of said trunk circuit for operating said recording means to record an end of data signal on said medium, a counting circuit, a pulse generator for operating said counting circuit and said drive means, means operated by said second control means for rendering said pulse generator effective to operate said counting circuit and to advance said medium following the recording of said end of data signal, and means controlled by said counting circuit for rendering said second control means ineffective when a selected number of pulses have been applied to said drive means.

2. The system set forth in claim 1 including an output recorder, second switching means for seizing said trunk circuit and for connecting said storage device to said output recorder so that the data stored in said storage device is transmitted to said output recorder, means for operating said second switching means to release said trunk circuit after the stored data has been transmitted to said output recorder, and means in said trunk circuit responsive to the release of said trunk circuit by said second switching means for again operating said pulse generator and said counting circuit to advance said medium.

3. In an automatic toll ticketing system, a subscriber line, line extending means for extending a connection from said line, storage means including an elongated storage medium for storing data pertaining to a call placed over said extended connection, means connected to said extended connection for operating said storage means to store said data, means including counting means effective at the termination of said connection for advancing said medium a selected distance to separate the data pertaining to one call from the data pertaining to another call, data recording means for providing a record of the data stored on said storage medium, switching means for seizing said storage means to transmit the data stored on said medium to said data recording means, and means including said counting means and operated by the release of said storage means by said switching means for advancing said medium a predetermined distance to condition the medium for receiving data pertaining to another call.

4. In an automatic toll ticketing system including a trunk circuit to which a connection is extended, a storage device connected to the trunk circuit and utilizing an elongated record medium advanced by a step-by-step drive mechanism, a counting means, pulse supplying means for operating said drive mechanism and said counting means, means for rendering said supplying means effective in accordance with the release of said connection to said trunk circuit, stop means controlled by said counting means for rendering said pulse supplying means ineffective, data recording means for providing a record of the data stored on said record medium, switching means for seizing said trunk circuit and said storage device to transmit the data stored on said medium to said data recording means, means for operating said switching means to release said trunk circuit and said storage device after said data has been transmitted to said data recording means, means responsive to the release of said switching means for rendering said pulse supplying means effective to operate said drive mechanism and said counting means and for rendering said stop means responsive to control by said counting means to stop said pulse supplying means after said record medium has been advanced a predetermined distance.

5. The system defined by claim 4 in which the counting means includes a stepping switch operated step-by-step from a normal position in synchronism with like operation of said drive mechanism and in which said stop means includes means for restoring said stepping switch to said normal position.

References Cited in the file of this patent

UNITED STATES PATENTS

| | | |
|---|---|---|
| 2,513,112 | Shepherd | June 27, 1950 |
| 2,733,425 | Williams et al. | Jan. 31, 1956 |
| 2,782,257 | Blashfield et al. | Feb. 19, 1957 |
| 2,794,070 | Ostline | May 28, 1957 |
| 2,874,369 | Blain et al. | Feb. 17, 1959 |
| 2,886,642 | Morris et al. | May 12, 1959 |